United States Patent
Kiso et al.

[11] Patent Number: 6,132,014
[45] Date of Patent: Oct. 17, 2000

[54] BRAKE CONTROL APPARATUS

[75] Inventors: Takahiro Kiso, Kariya; Kazutoshi Yogo, Aichi-gun; Mamoru Sawada, Yokkaichi, all of Japan

[73] Assignee: Denso Corporation, Kariya, Japan

[21] Appl. No.: 09/081,205

[22] Filed: May 20, 1998

[30] Foreign Application Priority Data

May 21, 1997 [JP] Japan ................................. 9-131241
Mar. 16, 1998 [JP] Japan ................................. 10-065859

[51] Int. Cl.⁷ .............................. B60T 8/04; B60T 8/60
[52] U.S. Cl. ...................................... 303/146; 303/140
[58] Field of Search ................................. 303/140, 146, 303/166; 701/83

[56] References Cited

U.S. PATENT DOCUMENTS

| | | | |
|---|---|---|---|
| 5,134,352 | 7/1992 | Matsumoto et al. | |
| 5,224,765 | 7/1993 | Matsuda. | |
| 5,576,959 | 11/1996 | Hrovat et al. | 303/146 |
| 5,704,695 | 1/1998 | Monzaki et al. | 303/146 |
| 5,711,025 | 1/1998 | Eckert et al. | 303/146 |
| 5,762,406 | 6/1998 | Yasui et al. | 303/146 |
| 5,857,754 | 1/1999 | Fukami et al. | 303/146 |
| 5,863,105 | 1/1999 | Sano | 303/146 |

FOREIGN PATENT DOCUMENTS

| | | |
|---|---|---|
| 9-226555 | 9/1887 | Japan. |
| 3-143757 | 6/1991 | Japan. |

*Primary Examiner*—Chris Schwartz
*Attorney, Agent, or Firm*—Pillsbury Madison & Sutro LLP

[57] ABSTRACT

A turning state of a vehicle is detected to specify an outer side front wheel and an inner side rear wheel of a turning circle. A controlling device controls the brake fluid pressures of wheel cylinders of the specified wheels so that the brake fluid pressure of the wheel cylinder of one of the specified wheels is made smaller than a master cylinder pressure while substantially simultaneously the brake fluid pressure of the wheel cylinder of the other wheel of the specified wheels is made larger than the master cylinder pressure.

11 Claims, 14 Drawing Sheets

- ▨ NON-CONTROLLED WHEEL
- ☐ BRAKING PRESSURE DECREASED WHEEL
- ■ BRAKING PRESSURE INCREASED WHEEL
- ⬅ BRAKING FORCE, SIDE FORCE GENERATED BY WHEEL
- ⇐ BRAKING FORCE, SIDE FORCE CHANGED BY BRAKING PRESSURE ADJUSTMENT
- ←--- YAW MOMENT ACTING ON VEHICLE BODY

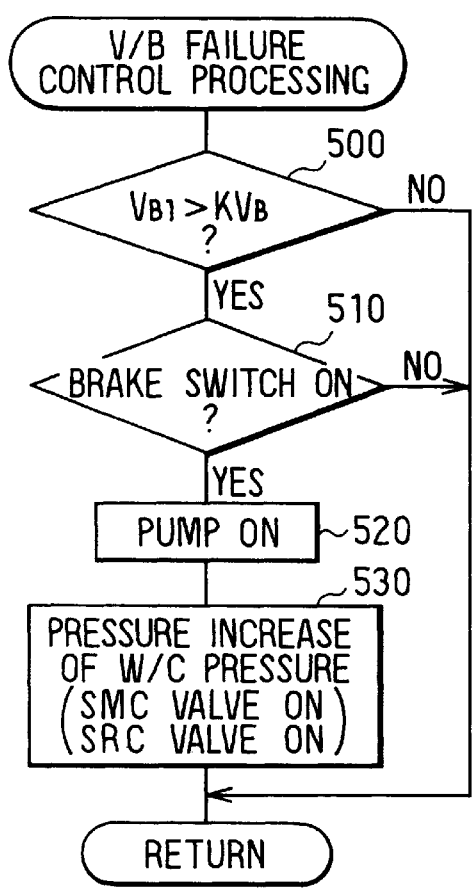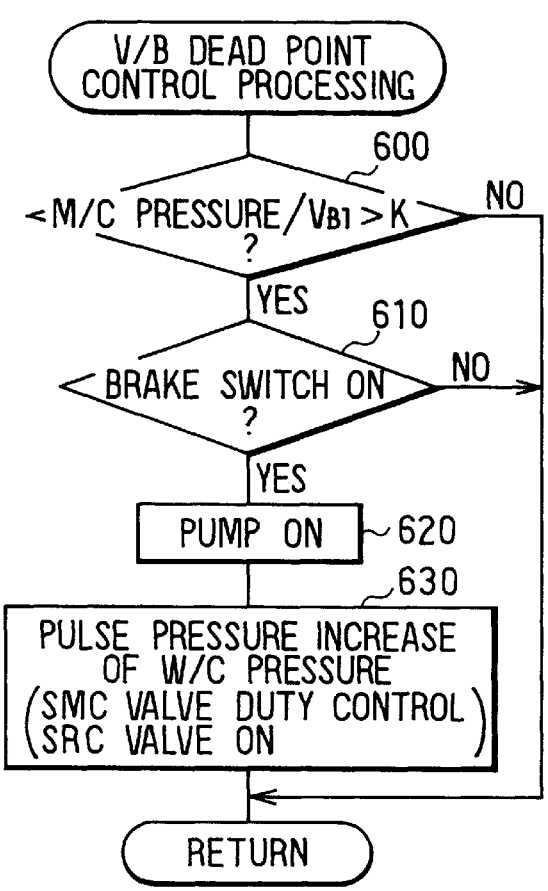

BRAKE CONTROL APPARATUS

CROSS REFERENCE TO RELATED APPLICATION

This application is based upon and claims the benefit of priority of Japanese Patent Application No. H.9-131241 filed on May 21, 1997 and No. H.10-65859 filed on Mar. 16, 1998, the contents of which are incorporated herein by reference.

BACKGROUND OF THE INVENTION

1. Field of the Invention

This invention relates to a brake control apparatus which can stabilize vehicle behavior when turning.

2. Related Art

Stabilizing vehicle behavior on braking, using, for example anti-skid control, has been known.

This anti-skid control is control wherein the brake hydraulic pressures applied to the wheel cylinders of the wheels are adjusted so that the slip ratios of the wheels fall in a predetermined range during braking caused by depression of a brake pedal. As a result, a braking force is fully exhibited by each of the wheels.

However, there are cases wherein the stabilization of the vehicle behavior is not sufficient with anti-skid control alone. For example, when a brake pedal is depressed during turning, the state of the load acting on the wheels changes. Therefore, by simply carrying out anti-skid control with respect to each wheel, the vehicle behavior is sometimes not stabilized.

That is, as shown in FIG. 1, during turning (for example during left turning), a force rotating the vehicle acts on each wheel according to the balance of longitudinal force (braking force) and side force acting on each wheel. In this case, for example when a left rotating force (an oversteer O/S tendency force) becomes excessive, the vehicle spins. On the other hand, when a right rotating force (an understeer U/S tendency force) becomes excessive, the vehicle drifts.

Also, for example during left turning, normally, the wheel speed of a rear left wheel falls first and its slip ratio increases. Consequently in anti-skid control, pressure-decreasing control is carried out with respect to the rear left wheel. At this time, during left turning, because a large load acts on the front right wheel, the influence of forces at the front right wheel with respect to the vehicle behavior becomes large. Consequently, with simply carrying out pressure-decreasing control with respect to the rear left wheel only, there is the problem that the vehicle behavior becomes unstable.

SUMMARY OF THE INVENTION

This invention was made in view of the above-mentioned problem, and it is an object thereof to provide a brake control apparatus which can prevent vehicle behavior becoming unstable when the brake pedal is depressed during turning.

In the present invention, a first brake fluid pressure producing device (for example a master cylinder) produces a first brake fluid pressure (for example a master cylinder pressure) for applying to wheel braking force producing devices (for example wheel cylinders), and the wheel braking force producing devices produce wheel braking forces (for example wheel braking forces derived from a wheel cylinder pressure) in wheels during vehicle braking.

Then, a specifying device detects the turning state of the vehicle and specifies an outer side front wheel and an inner side rear wheel of a turning circle. A controlling device controls the brake fluid pressures of the wheel braking force producing devices of the wheels specified by the specifying device so that the brake fluid pressure of the wheel braking force producing device of one of the wheels is made smaller than the first brake fluid pressure while substantially simultaneously the brake fluid pressure of the wheel braking force producing device of the other wheel is made larger than the first brake fluid pressure.

That is, when a vehicle is turning, according to the speed, the steering angle, the state of the wheels, the state of the road surface and so on, as shown in FIG. 1, the vehicle body sometimes receives a rotating force to the oversteer (O/S) side (the A direction) and spins, or reversely, receives a rotating force to the understeer (U/S) side (the B direction) and drifts.

In this case, by increasing or decreasing the brake fluid pressures of the wheel braking force producing devices of the wheels (1 to 4) shown in FIG. 1, a yaw moment arises and the side forces change due to braking force differences between the left and right wheels. Consequently, it is possible to apply rotating forces as shown in Table 1 below and thereby it is possible to control the vehicle behavior.

TABLE 1

| No. | Wheel | | Generation of Yaw Moment | Side Force Reduction | Total Vehicle Behavior | |
|---|---|---|---|---|---|---|
| 1 | Inner side front wheel | Pressure Increase | O/S side | U/S side | ? | |
| | | Pressure Decrease | U/S side | O/S side | ? | |
| 2 | Outer side front wheel | Pressure Increase | U/S side | U/S side | U/S | ① |
| | | Pressure Decrease | O/S side | O/S side | O/S | ④ |
| 3 | Inner side rear wheel | Pressure Increase | O/S side | O/S side | O/S | ③ |
| | | Pressure Decrease | U/S side | U/S side | U/S | ② |
| 4 | Outer side rear wheel | Pressure Increase | U/S side | O/S side | ? | |
| | | Pressure Decrease | O/S side | U/S side | ? | |

An example of how to look at this Table 1 will now be described. For example in No.1, if the inner side front wheel of turning is selected as the pressure-increase wheel and its wheel cylinder pressure is increased, the yaw moment resulting from a difference in road surface reaction between the left and right wheels acts to strengthen the O/S tendency of the vehicle body, and due to side force reduction of the inner side front wheel the vehicle body comes to have the U/S tendency. And in No.2, if the outer side front wheel of turning is selected as the pressure-decrease wheel and its wheel cylinder pressure is reduced, the yaw moment resulting from a difference in road surface reaction between the left and right wheels acts to strengthen the O/S tendency of the vehicle body and the side force reduction also acts to strengthen the O/S tendency thereof. Therefore, also as a total vehicle behavior, reducing the brake pressure of the outer side front wheel acts to strengthen the O/S tendency of the vehicle body.

In other words, as is clear from this Table 1 and FIG. 2A, for example in a case of left turning, to perform control for reducing an O/S tendency of a vehicle body, that is, anti-spin control applying a force to the U/S side to prevent spin of a vehicle, it is only necessary to ① increase the brake pressure of the outer side front wheel of turning and ②
decrease the pressure of the inner side rear wheel thereof. A
force to the U/S side can be applied to the vehicle body to
effect spin prevention by executing either one of controls ①
and ② alone. However, if controls ① and ② are carried
out simultaneously, the action to the U/S side increases and
the anti-spin control capacity rises. This is the same in
controls ③ and ④ discussed hereinafter.

And, as is clear from Table 1 and FIG. 2B, for example in
a case of left turning, to perform control for reducing a U/S
tendency of a vehicle body, that is, anti-drift control apply-
ing a force to the O/S side to prevent drift, it is only
necessary to ③ increase the brake pressure of the inner side
rear wheel of turning and ④ decrease the brake pressure of
the outer side front wheel thereof. The parts where a
question mark has been assigned to the total vehicle behav-
ior are cases wherein due to the yaw moment generated by
a difference in road surface reaction between the left and
right wheels and side force reduction, forces to O/S side and
U/S side appear and it is not possible to determine which
side the vehicle behavior will be headed for.

The case of right turning also is in principle exactly the
same.

Thus, in this invention, with respect to wheel braking
force producing devices of wheels specified by the specify-
ing device, by making the brake fluid pressure of the wheel
braking force producing device of one wheel smaller than
the first brake fluid pressure while substantially simulta-
neously making the brake fluid pressure of the wheel brak-
ing force producing device of the other wheel larger than the
first brake fluid pressure, it is possible to prevent the
occurrence of spin and drift, and to stabilize the vehicle
behavior.

In correspondence with the turning state of the vehicle,
the brake fluid pressure of the wheel braking force produc-
ing device of the inner side rear wheel of turning may be
reduced, and by an amount of brake fluid equal to this
pressure decrease, the brake fluid pressure of the wheel
braking force producing device of the outer side front wheel
of turning may be increased to a second brake fluid pressure
higher than the first brake fluid pressure.

During turning, a larger load acts on the outer side front
wheel of turning than on the inner side rear wheel thereof.
Consequently, by raising the brake fluid pressure of the outer
side front wheel further than the inner side rear wheel, it is
possible to increase the braking force, that is, reduce the side
force, of the outer side front wheel of which influence on
rotation (turning) is large. Therefore, it is possible to reduce
the force rotating the vehicle effectively. As a result, it is
possible to stabilize the vehicle behavior.

When wheels have been specified by the specifying
device, the brake fluid pressure of the wheel braking force
producing device of one wheel may be held and the brake
fluid pressure of the wheel braking force producing device
of the other wheel may be made larger than the first brake
fluid pressure.

For example, by holding the brake fluid pressure of the
inner side rear wheel and by increasing the brake fluid
pressure of the outer side front wheel, a U/S side yaw
moment arises and consequently it is possible to prevent
spin.

Reversely, for example by holding the brake fluid pressure
of the outer side front wheel and by increasing the brake
fluid pressure of the inner side rear wheel, an O/S side yaw
moment arises and consequently it is possible to prevent
drift.

After wheels have been specified by the specifying
device, when the brake fluid pressure of the wheel braking
force producing device of one wheel of the specified wheels
is reduced by anti-skid control, the brake fluid pressure of
the wheel braking force producing device of the other wheel
may be increased.

During anti-skid control, the braking force of a wheel is
adjusted in accordance with the slip state of the wheel.
However, for example when slip has occurred in the rear left
wheel during left turning as shown in FIG. 2A, the side force
of the rear left wheel falls and there arises a spin tendency.
However, even if the braking force on the rear left wheel is
weakened to reduce its slip, because the load itself on the
rear left wheel is small, sometimes a sufficient U/S side yaw
moment does not arise.

According to this invention, in that kind of case, the brake
fluid pressure of the other wheel (in this case the front right
wheel) is increased. By increasing the braking force of the
front right wheel, a still greater yaw moment is made to arise
and consequently it is possible to prevent spin.

Reversely, for example as shown in FIG. 2B, when slip
has occurred at the front right wheel during left turning, the
side force of the front right wheel falls and there arises a drift
tendency. However, even if the braking force on the front
right wheel is weakened to reduce its slip, sometimes a
sufficient O/S side yaw moment does not arise.

According to this invention, in that kind of case, the brake
fluid pressure of the other wheel (in this case the rear left
wheel) is increased. By increasing the braking force of the
rear left wheel, a much larger yaw moment is made to arise
and consequently it is possible to prevent drift.

With respect to the other wheel of which the brake fluid
pressure of the wheel braking force producing device is
increased, a pressure-decrease start reference of anti-skid
control may be set so as to be larger than a normal pressure-
decrease start reference, i.e., to be difficult for pressure-
decrease to be started.

This pressure-decrease start reference is a reference value
(for example slip ratio) for determining whether or not to
start pressure-decreasing control in anti-skid control.

In other words, as described above, when the brake fluid
pressure of a wheel that should be controlled is increased,
the level of slip increases. However, with all other things
being equal, pressure-reduction of anti-skid control will be
started and the brake fluid pressure that had been desirably
increased is consequently reduced.

To overcome this, in this invention, when control increas-
ing the brake fluid pressure during turning is carried out, the
pressure-decrease start reference is changed so that the start
of pressure-reduction of anti-skid control is delayed and
therefore the brake fluid pressure is not soon lowered.

By this means, because the degree of slip of the wheel
increases and the side force thereof falls, it is possible to
obtain a desired rotating force (preventing spin or drift).

In another aspect of the present invention, the turning
state of the vehicle is detected by the specifying device and
the outer side front wheel of turning and the inner side rear
wheel thereof are specified. In this state, a slip state detecting
device preferably detects the slip states of the wheels. On the
basis of the detection results of this slip state detecting
device, an anti-skid controlling device adjusts the brake fluid
pressure acting on the wheel braking force producing device
corresponding to a wheel whose slip has become excessive.

Then, in a period when pressure-decreasing control of the
anti-skid controlling device is being executed with respect to the wheel braking force producing device of one of the wheels specified by the specifying device, the brake fluid pressure acting on the wheel braking force producing device of the other wheel of the specified wheels may be increased.

In other words, for example as shown in FIG. 2A, when slip has occurred in the rear left wheel during left turning, the side force of the rear left wheel falls and there arises a spin tendency. However, even if the braking force on the rear left wheel is weakened to reduce its slip by pressure-decreasing control of anti-skid control, because the load itself on the rear left wheel is small, sometimes a sufficient U/S side yaw moment does not arise.

According to this invention, in that kind of case, the brake fluid pressure of the other wheel (in this case the front right wheel) is increased. By increasing the braking force of the front right wheel, a much greater yaw moment is made to arise and consequently it is possible to prevent spin.

And, reversely, for example as shown in FIG. 2B, when slip has occurred at the front right wheel during left turning, the side force of the front right wheel falls and there arises a drift tendency. However, even if the braking force on the front right wheel is weakened to reduce its slip by pressure-decreasing control of anti-skid control, sometimes a sufficient O/S side yaw moment does not arise.

According to this invention, in that kind of case, the brake fluid pressure of the other wheel (in this case the rear left wheel) is increased. By increasing the braking force of the rear left wheel, a much larger yaw moment is made to arise and consequently it is possible to prevent drift.

When the anti-skid controlling device is being implemented with respect to the wheel braking force producing device of the other wheel of the specified wheels, the brake fluid pressure acting on this other wheel may be increased preferentially to the command from the anti-skid controlling device.

That is, when pressure-decreasing control of anti-skid control is being carried out with respect to one wheel (of the specified wheels), even if a pressure-decreasing output or a holding output of anti-skid control is being outputted to the other wheel, pressure-increasing using a master cylinder pressure for example is carried out to the wheel braking force producing device of the other wheel.

In other words, in this invention, the pressure-decrease start reference of anti-skid control is not changed and the pressure-decrease start reference is, for example, the same for all wheels. However, when pressure-decreasing control of anti-skid control is being carried out with respect to one wheel during turning, pressure-increasing control is carried out with respect to the other wheel. From the principle explained with Table 1, for example in the case of left turning, to carry out anti-spin control, it is only necessary to ① increase the brake fluid pressure of the outer side front wheel of turning and ② decrease the brake fluid pressure of the inner side rear wheel thereof. To carry out anti-drift control, it is only necessary to ③ increase the brake fluid pressure of the inner side rear wheel of turning and ④ decrease the brake fluid pressure of the outer side front wheel thereof. Therefore, by the above-mentioned pressure-increasing control, it is possible to prevent the occurrence of spin and drift and thereby to stabilize the vehicle behavior.

When the anti-skid controlling device is being implemented with respect to the wheel braking force producing device of the other wheel of the specified wheels, the controlling device can make the output from the anti-skid controlling device with respect to the other wheel a pressure-increasing output.

In this case, in the same manner as mentioned above, when pressure-decreasing control of anti-skid control is being carried out to one wheel (of the specified wheels), even if a pressure-decreasing output or a holding output of anti-skid control is being outputted to the other wheel side, for example pressure-increasing using a master cylinder pressure can be carried out. By this means, it is possible to prevent the occurrence of spin and drift and to stabilize the vehicle behavior.

When the specifying device detects the turning state of the vehicle and specifies an outer side front wheel and an inner side rear wheel of turning, the controlling means adjusts brake fluid pressures of wheel braking force producing devices of the specified wheels to carry out control for controlling the vehicle behavior on turning. Along with this, anti-skid controlling device can be provided to control wheel braking forces by adjusting brake fluid pressures of wheel braking force producing devices of wheels during vehicle braking resulting from operation of a brake operation member (for example a brake pedal) by a driver. When vehicle behavior control on turning is being executed, it is preferable to suspend anti-skid control.

In other words, when vehicle behavior control on turning is carried out, the brake fluid pressures of the wheel braking force producing device of the outer side front wheel and the inner side rear wheel of turning are adjusted. If anti-skid control is carried out at the same time, the brake fluid pressures of the wheel braking force producing devices are also adjusted as necessary by anti-skid control.

Consequently, even when to carry out desirable vehicle behavior control on turning and a suitable brake fluid pressure has been set for a certain wheel, if anti-skid control is carried out at the same time, there is a possibility of that brake fluid pressure being changed.

To overcome this, while vehicle behavior control on turning is desirably carried out, the anti-skid control is suspended.

In this case, when vehicle behavior control on turning has finished, even when conditions for anti-skid control are satisfied, anti-skid control is not executed.

As an object wheel of which anti-skid control is suspended, a front wheel is selected.

In other words, even when to carry out vehicle behavior control on turning, a suitable brake fluid pressure has been set with respect to a front wheel only. Although it is inferior in an effect controlling a vehicle behavior than a case in which suitable brake fluid pressures are set with respect to all the wheels, there is a considerable effect.

When the specifying device detects the turning state of the vehicle and specifies an outer side front wheel and an inner side rear wheel of turning, the controlling device adjusts brake fluid pressures of wheel braking force producing devices of the specified wheels to carry out vehicle behavior control for controlling the vehicle behavior on turning. When vehicle behavior control on turning is being executed, vehicle behavior control on turning can be given priority over anti-skid control carried out during vehicle braking resulting from operation of a brake operating member by a driver.

In other words, as explained above, to prevent vehicle behavior control on turning being lost as a result of anti-skid control, vehicle behavior control on turning is given priority over the anti-skid control.

In this case, when vehicle behavior control on turning has ended, if conditions for starting anti-skid control are satisfied, anti-skid control is executed.

As an object wheel of which vehicle behavior control on turning is given priority, a front wheel is selected.

As a result, even when to carry out vehicle behavior control on turning, a suitable brake fluid pressure has been set with respect to a front wheel only. Although it is inferior in an effect controlling a vehicle behavior than a case in which suitable brake fluid pressures are set with respect to all the wheels, there is a considerable effect.

As a brake pipe arrangement of the brake control apparatus, so-called front-rear pipe arrangement can be employed.

In this front-rear pipe arrangement, during vehicle braking, a first brake fluid pressure produced by a first brake fluid pressure producing device (for example a master cylinder) is transmitted through a first pipe system to first and second wheel braking force producing devices (for example wheel cylinders) of one side of front and rear wheels and is transmitted through a second pipe system to third and fourth wheel braking force producing devices of the other side of front and rear wheels.

As the brake pipe arrangement of the brake control apparatus, so-called X pipe arrangement can be employed.

In this X pipe arrangement, during vehicle braking, a first brake fluid pressure produced by a first brake fluid pressure producing device is transmitted through a first pipe system to first and fourth wheel braking force producing devices of front and rear wheels positioned diagonally and is transmitted through a second pipe system to second and third wheel braking force producing devices of front and rear wheels also positioned diagonally.

BRIEF DESCRIPTION OF THE DRAWINGS

This and other objects, features and characteristics of the present invention will be appreciated from a study of the following detailed description, the appended claims, and drawings, all of which form a part of this application. In the drawings:

FIG. 10 is a flow chart showing vacuum booster (V/B) failure control processing of the first embodiment;

FIG. 11 is a flow chart showing V/B dead point control processing of the first embodiment;

DETAILED DESCRIPTION OF PREFERRED EMBODIMENTS

Preferred embodiments of the present invention will now be described in detail on the basis of drawings.

(First Embodiment)

This embodiment relates to a brake control apparatus which, when a brake pedal is depressed on turning of an FF vehicle, irrespective of whether during anti-skid control or not during anti-skid control, prevents the vehicle behavior becoming unstable.

Figure 3:
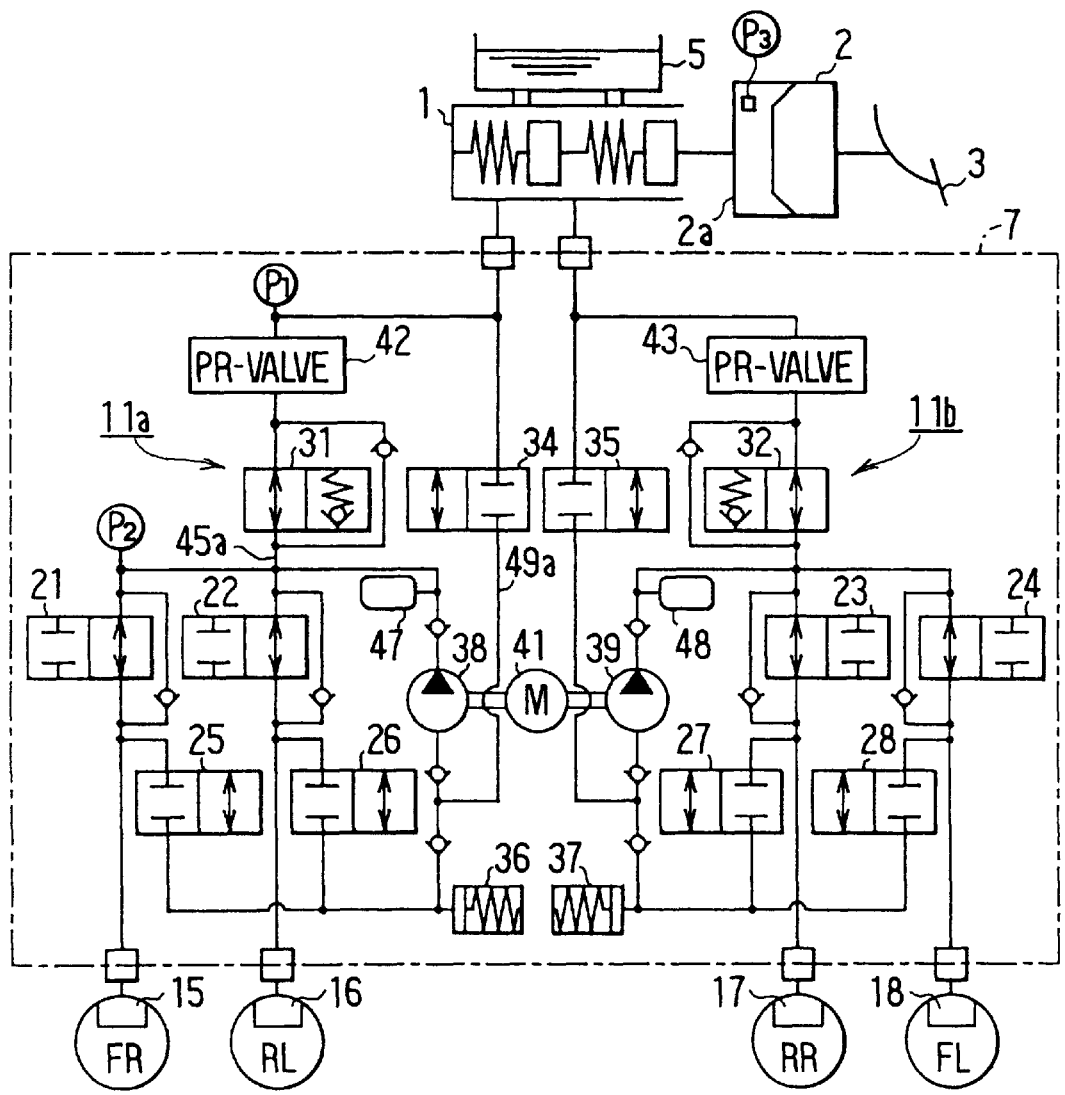
FIG. 3 is an outline construction view showing a brake control apparatus of a first embodiment.

FIG. 3 is an outline construction view of a brake control apparatus for a vehicle which can carry out known anti-skid control (ABS control) and power braking control (PB control) capable of raising the braking force further than normal and the like.

As shown in FIG. 3, the brake control apparatus has a tandem type master cylinder 1. A brake pedal 3 is connected to the master cylinder 1 by way of a brake booster 2. Also, a master reservoir 5 is connected to the master cylinder 5.

Also, connected to the master cylinder 1 is a hydraulic control circuit 7 made up of two hydraulic systems of an X pipe arrangement (diagonal pipe arrangement). In each of two hydraulic systems, brake fluid pressure is adjusted by valves and a pump which are described in detail later. That is, the hydraulic control circuit 7 is made up of a first hydraulic pipe arrangement 11a and a second hydraulic pipe arrangement 11b.

A wheel cylinder 15 of a front right (FR) wheel and a wheel cylinder 16 of a rear left (RL) wheel are connected by way of the first hydraulic pipe arrangement 11a in the hydraulic control circuit 7. A wheel cylinder 17 of a rear right (RR) wheel and a wheel cylinder 18 of a front left (FL) wheel are connected by way of the second hydraulic pipe arrangement 11b.

In the first hydraulic pipe arrangement 11a, a known pressure-increase control valve 21 and a pressure-decrease control valve 25 for controlling the hydraulic pressure of the wheel cylinder 15 of the FR wheel and a pressure-increase control valve 22 and a pressure-decrease control valve 26 for controlling the hydraulic pressure of the wheel cylinder 16 of the RL wheel are provided. In the second hydraulic pipe arrangement 11b, a pressure-increase control valve 23 and a pressure-decrease control valve 27 for controlling the hydraulic pressure of the wheel cylinder 17 of the RR wheel and a pressure-increase control valve 24 and a pressure-decrease control valve 28 for controlling the hydraulic pressure of the wheel cylinder 18 of the FL wheel are provided.

Here, the first hydraulic pipe arrangement 11a will be described in more detail.

On the master cylinder 1 side of the pressure-increase control valves 21, 22, a master cylinder cut valve (SMC valve) 31 for alternatively opening and closing a hydraulic passage 45a and a pressure-regulating valve 42 for increasing the pressure of the wheel cylinder 15, 16 side are provided. The SMC valve 31 is of a structure such that, even when its valve body is in the closed position, if the pressure of the wheel cylinder 15, 16 side has reached a high pressure greater than the master cylinder 1 side by a predetermined pressure, a flow path therein opens.

The pressure-regulating valve 42 is used in the above-mentioned PB control, and consists of a known proportional control valve (proportioning valve) connected in reverse. A proportioning valve is normally used for lowering the wheel cylinder pressure of the rear wheel side rather than the front wheel side in the same hydraulic pipe arrangement. The pressure-regulating valve 42 is a proportioning valve connected in reverse. That is, the proportioning valve is connected so that the pressure on a master cylinder side becomes lower than the pressure on a wheel cylinder side. Therefore, by this reverse-connected proportional control valve, for example when a hydraulic pump 38 is driven (with an SRC valve 34 open), it is possible for the hydraulic pressure of the hydraulic passage 45a side to be made higher than the master cylinder 1 side in accordance with a predetermined proportion determined thereby.

In the first hydraulic pipe arrangement 11a, a reservoir 36 which temporarily stores brake fluid discharged from the pressure-decrease control valves 25, 26 and a hydraulic pump 38 for pumping brake fluid to the hydraulic passage 45a are provided. In the delivery route of brake fluid from the hydraulic pump 38, an accumulator 47 which suppresses hydraulic pressure pulsations is provided.

Also, in the first hydraulic pipe arrangement 11a, a hydraulic pressure passage 49a for supplying brake fluid from the master cylinder 1 directly to a cut valve (SRC valve) 34 when the wheel cylinder pressure is to be increased is provided. In this hydraulic pressure passage 49a, the SRC valve 34 for alternatively opening and closing the hydraulic pressure passage 49a is provided.

In the second hydraulic pipe arrangement 11b, in the same way as in the first hydraulic pipe arrangement 11a, pressure-increase control valves 23, 24, pressure-decrease control valves 27, 28, an SMC valve 32, a pressure-regulating valve 43, a reservoir 37, a hydraulic pump 39, an accumulator 48, an SRC valve 35 and so on are provided in the same locations.

The two hydraulic pumps 38, 39 are connected to and driven by an electric pump motor 41.

Figure 4:
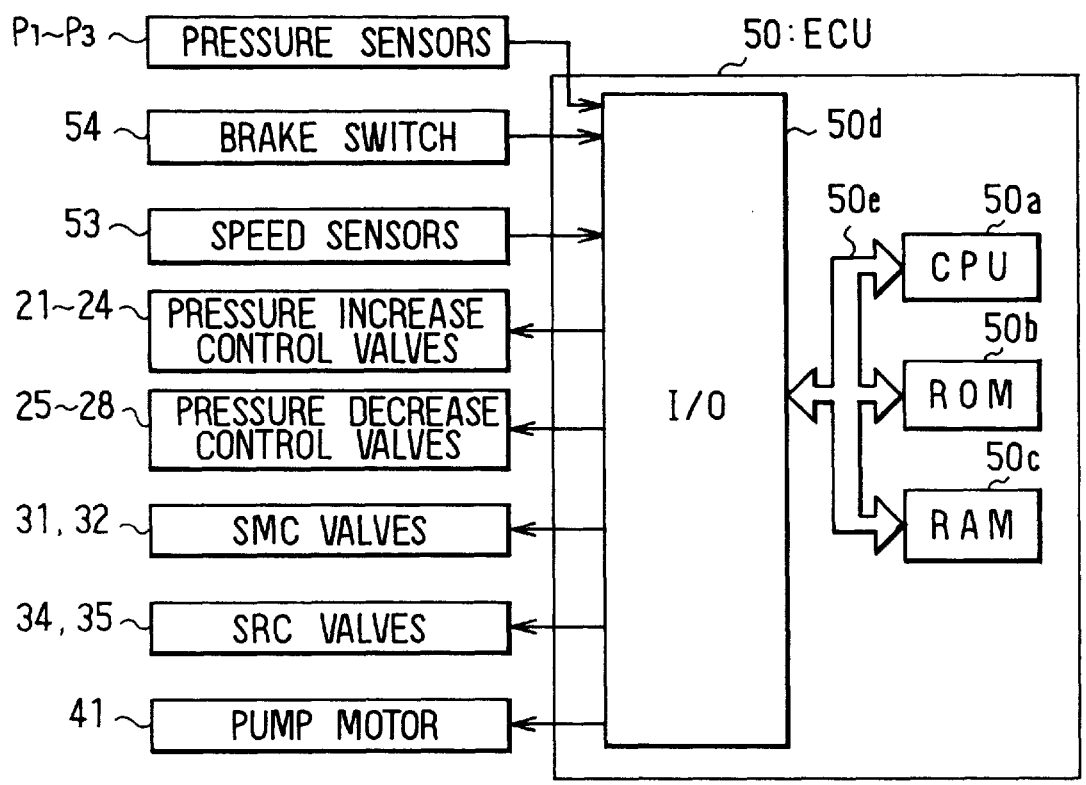
FIG. 4 is a block diagram showing the construction of an electronic control unit of the first embodiment.

As shown in FIG. 4, an ECU 50 which controls the brake control apparatus described above is made up of a microcomputer having a known CPU 50a, ROM 50b, RAM 50c, an input-output port 50d and a bus line 50e.

Signals from wheel speed sensors 53 which detect the wheel speed VW of each wheel, a brake switch (BS) 54 which detects that the brake pedal 3 has been depressed, a pressure sensor P1 which detects the master cylinder pressure (M/C pressure), a pressure sensor P2 which detects the wheel cylinder pressure (W/C pressure), and a pressure sensor P3 which detects the pressure (a negative pressure) of a negative pressure chamber 2a of the brake booster 2 are inputted into the ECU 50.

Control signals for driving control actuators such as the pressure-increase control valves 21 through 24, the pressure-decrease control valves 25 through 28, the SMC valves 31, 32 and the SRC valves 34, 35, which are electromagnetic valves, and the pump motor 41 are outputted from the ECU 50.

Next, control processing in this embodiment will be described on the basis of the flow charts of FIG. 5 through FIG. 8, FIG. 10 through FIG. 13 and the diagrams of FIG. 9, FIG. 14 and FIG. 15.

Figure 5:
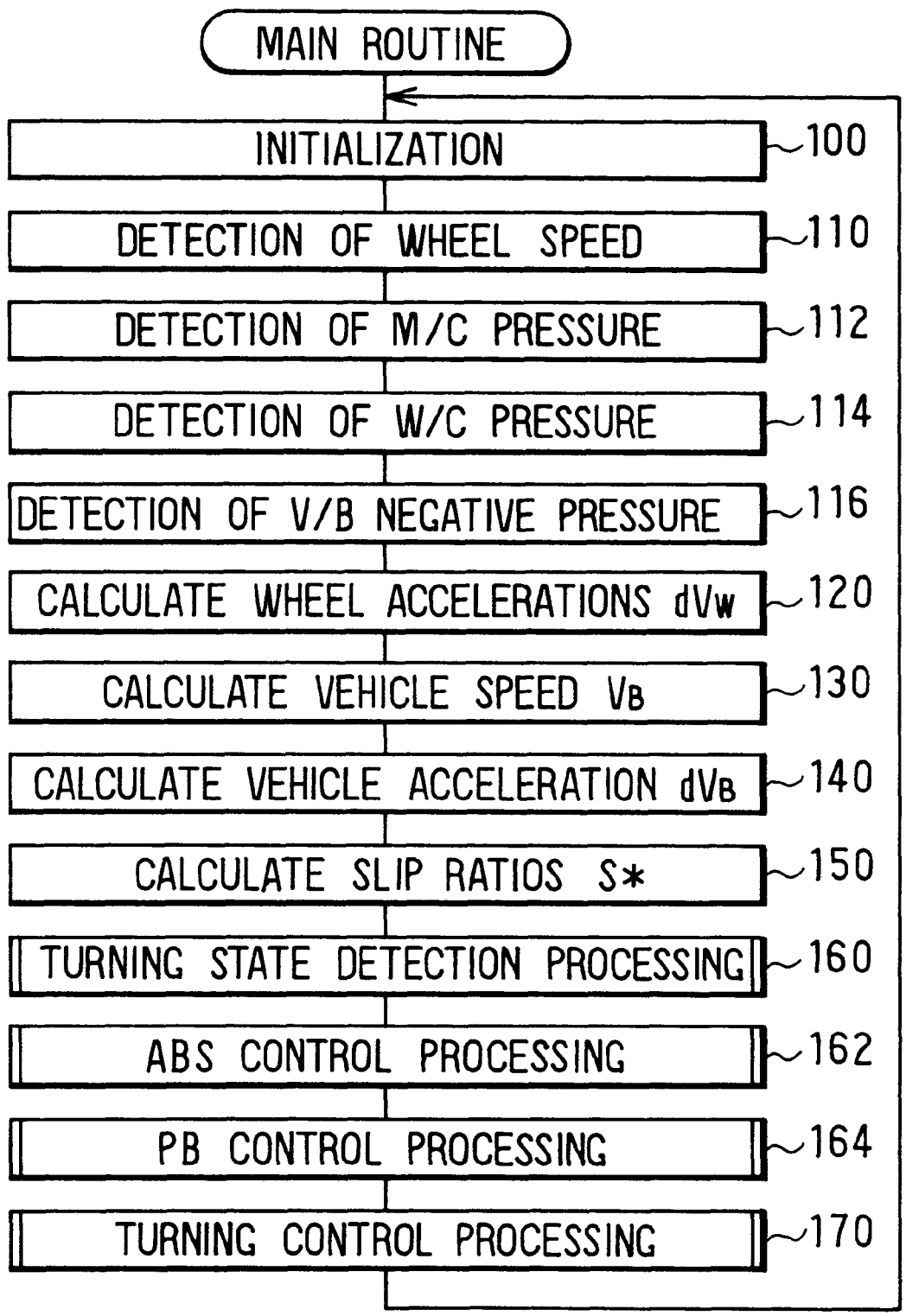
FIG. 5 is a flow chart showing main control processing of the first embodiment.

First, main processing will be described on the basis of the flow chart of FIG. 5.

In step 100, initialization is carried out.

In the following Step 110, the speeds Vw of the wheels are detected on the basis of signals from the wheel speed sensors 53.

In the following Step 112, the M/C pressure is detected on the basis of a signal from the pressure sensor P1.

In the following Step 114, the W/C pressure is detected on the basis of a signal from the pressure sensor P2.

In the following Step 116, the negative pressure of a variable pressure chamber, that is, the negative pressure chamber, of the brake booster (V/B) 2 is detected on the basis of a signal from the pressure sensor P3.

In the following Step 120, the wheel speeds Vw are differentiated to calculate wheel accelerations dVw, respectively.

In the following Step 130, the vehicle speed VB is calculated by a known method. In the following Step 140, the vehicle speed VB is differentiated to calculate the vehicle acceleration dVB.

In the following Step 150, the slip ratios $S^*(=(VB-Vw)/VB)$ in the wheels are calculated from the vehicle speed VB and the wheel speeds Vw. Here, sign "*" shows the identity of each wheel and is any of FR, FL, RR, RL.

In the following Step 160, turning state detection processing which will be discussed later is carried out.

In the following Step 162, ABS control processing which will be discussed later is carried out.

In the following Step 164, PB control processing which will be discussed later is carried out.

In the following Step 170, turning control processing which will be further discussed later is carried out, and processing returns to Step 110.

Next, on the basis of the flow chart of FIG. 6, the turning state detection processing carried out in the above-mentioned Step 160 will be described.

This turning state detection processing is for detecting wheels to be concerned with turning control of this embodiment (control object wheels positioned in the direction of the diagonal among the four wheels). That is, the turning state detection processing is processing for detecting the turning direction of the vehicle and detecting which wheel is an outer side front wheel of turning and which wheel is an inner side rear wheel of turning.

Figure 6:
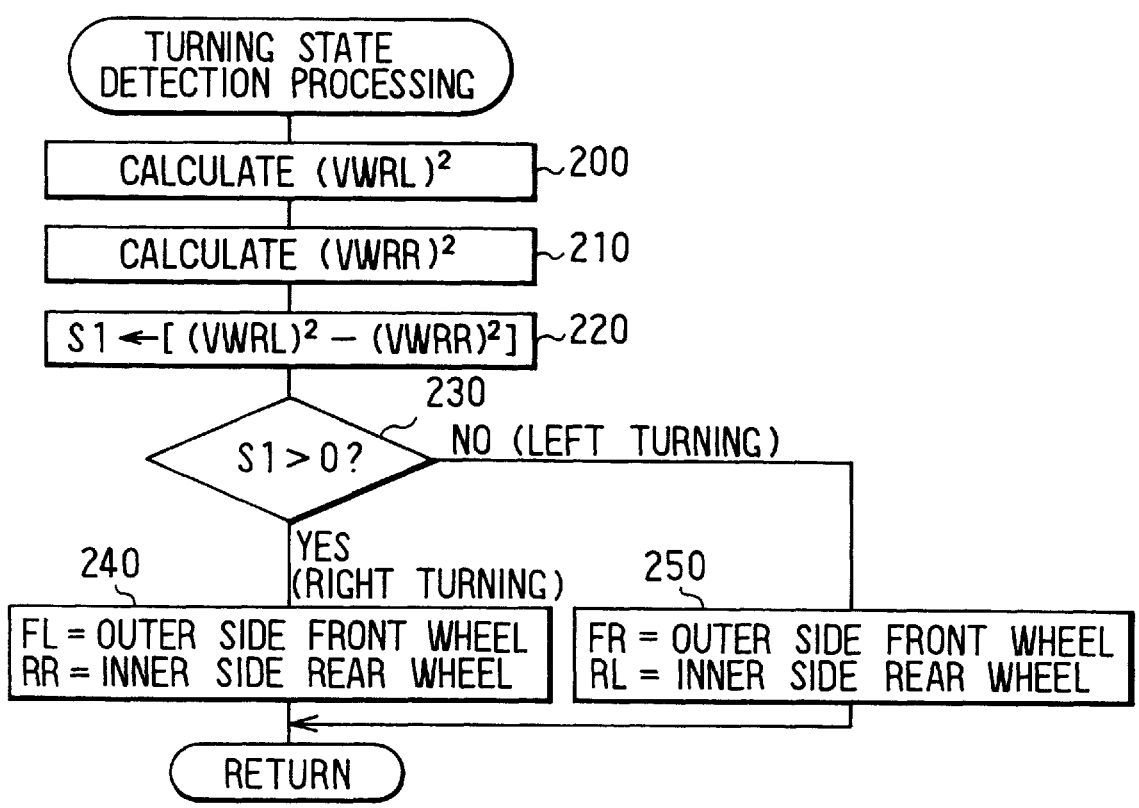
FIG. 6 is a flow chart showing turning state detection processing of the first embodiment.

In Step 200 of FIG. 6, the wheel speed VWRL of the rear left wheel, which is a driven wheel of the FF vehicle, is squared to calculate a value $(VWRL)^2$.

In the following Step 210, the wheel speed VWRR of the rear right wheel, which is also a driven wheel of the FF vehicle, is squared to calculate a value $(VWRR)^2$.

In the following Step 220, the square $(VWRR)^2$ of the wheel speed of the rear right wheel is subtracted from the square $(VWRL)^2$ of the wheel speed VwRL of the rear left wheel to obtain a difference S1. This difference S1 corresponds to a turn angular velocity of the turning of the vehicle.

In the following Step 230, it is determined whether or not the difference S1 of the squares of the left and right wheel speeds is positive. When an affirmative determination is made here, it is inferred that the vehicle is in a right turning and processing proceeds to Step 240. On the other hand, if a negative determination is made it is inferred that the vehicle is in a left turning and processing proceeds to Step 250.

In other words, because the difference S1 being positive shows that the wheel speed VWRL of the left wheel is large, it is determined that the vehicle is in a right turning. If the difference Si is negative, because it shows that the wheel speed VwRR of the right wheel is large, it is determined that the vehicle is in a left turning.

In Step 240, because of the right turning, the front left wheel FL is set as the outer side front wheel of turning, and the rear right wheel is set as the inner side rear wheel of turning. That is, during right turning, the wheels for which turning control of this embodiment is carried out are set to be the front left wheel FL and the rear right wheel RR in diagonal positions of the vehicle, and this processing ends once.

In Step 250, on the other hand, because of the left turning, the front right wheel FR is set as the outer side front wheel of turning, and the rear left wheel RL is set as the inner side rear wheel of turning. That is, during left turning, the wheels for which turning control of this embodiment is carried out are set to be the front right wheel FR and the rear left wheel RL, which are in diagonal positions of the vehicle, and this processing ends once.

Next, on the basis of the flow chart of FIG. 7, the ABS control processing of the above-mentioned Step 162 will be described.

This ABS control (anti-skid control) processing is processing which, during braking originated by depression of the brake pedal 3, in order to fully exhibit a braking force in each wheel, adjusts the brake hydraulic pressures (wheel cylinder pressures) applied to the wheel cylinders 15 through 18 of the wheels so that the slip ratios S* of the wheels lie in a predetermined range.

Figure 7:
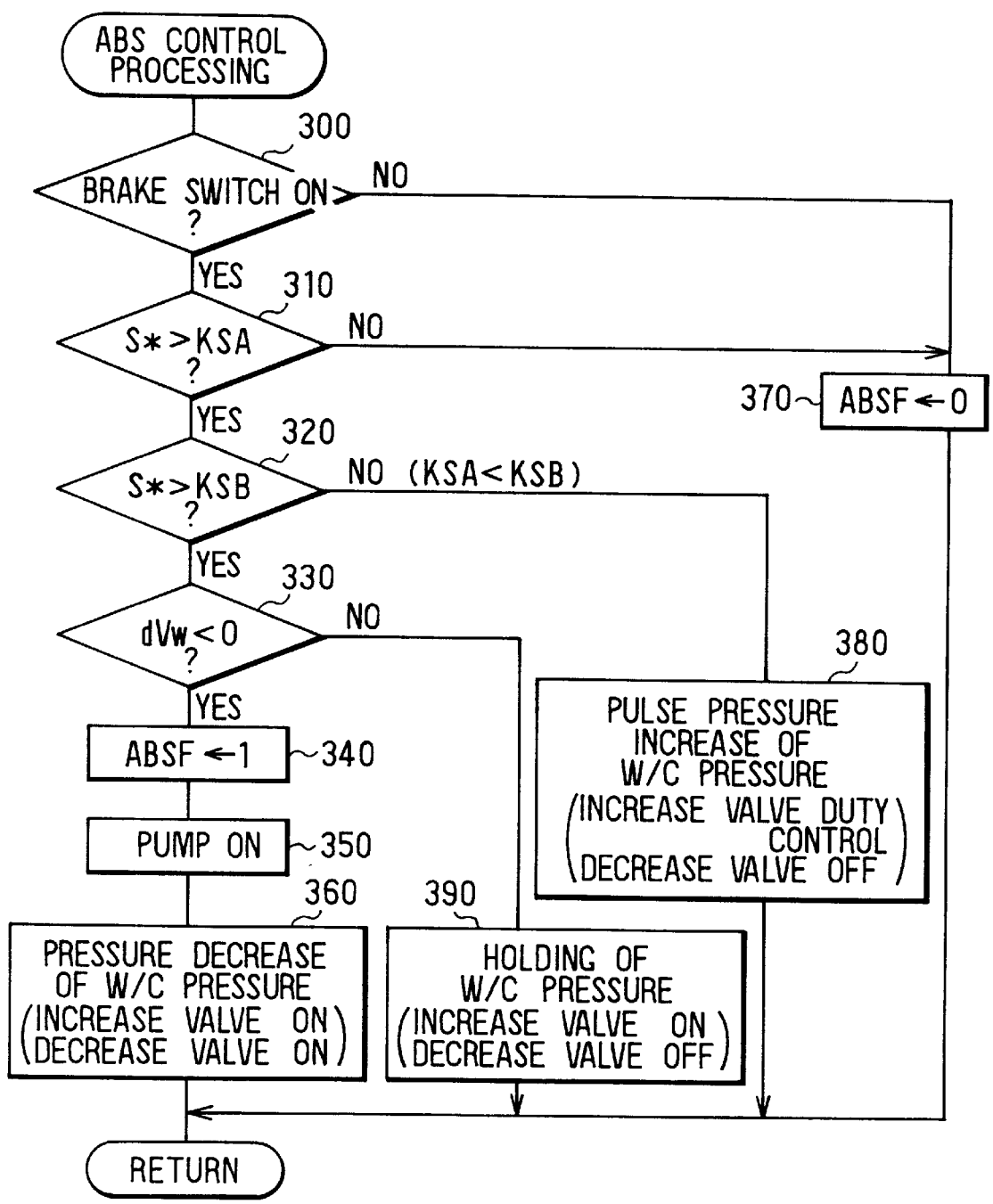
FIG. 7 is a flow chart showing ABS control processing of the first embodiment.

First, in Step 300 of FIG. 7, it is determined according to whether or not the brake switch 54 is on whether or not the brake pedal 3 has been depressed. When an affirmative determination is made here processing proceeds to Step 310. On the other hand, when a negative determination is made processing proceeds to Step 370, a flag ABSF showing that ABS control is in progress is reset (that is, because ABS control is not in progress, the flag ABSF is reset to 0), and this processing ends once.

In Step 310, it is determined whether or not the slip ratio S* of a control object wheel of ABS control is greater than a reference value kSA (for example 7%). When an affirmative determination is made here processing proceeds to Step 320, and when, on the other hand, a negative determination is made processing proceeds to the above-mentioned Step 370 and this processing ends once.

This reference value kSA is a control reference used for determining whether anti-skid control should be started from a normal braking state.

In Step 320, it is determined whether or not the slip ratio S* of the control object wheel is greater than a reference value KSB (pressure-decrease start reference; for example 15%; kSA<kSB) used for determining whether pressure-decrease control of ABS control starts to be executed. When an affirmative determination is made here, i.e. when it is determined that conditions for executing pressure-decrease control of ABS control are satisfied, processing proceeds to Step 330. When, on the other hand, a negative determination is made, i.e. when it is determined that the slip ratio S* is smaller than the reference value KSB and increasing the braking force is necessary, processing proceeds to Step 380.

In this Step 380, because there is some room to increase the wheel cylinder pressure (W/C pressure), the wheel cylinder pressure is gradually increased by a pulse signal having a predetermined pattern, and then this processing ends once. Specifically, the pressure-increase control valve (21 to 24) provided to the control object wheel is duty controlled between open and closed positions. At this time, electrical current supply to the pressure-decrease control valve (25 to 28) provided thereto is not carried out. Due to this, the pressure-decrease control valve is brought to its closed state. As a result, the wheel cylinder pressure is gradually increased and the braking force of the control object wheel is increased.

In Step 330, it is determined whether or not the wheel acceleration dVw of the control object wheel is lower than 0, that is, whether the wheel speed Vw is decreasing or recovering. When an affirmative determination is made, processing proceeds to Step 340, and when on the other hand a negative determination is made, processing proceeds to Step 390.

In Step 390, because the wheel speed Vw is in a recovering state and it can be considered that a desirable braking state is being maintained, control for holding the wheel cylinder pressure is carried out and then the present processing is ended. Specifically, electrical current supply to the pressure-increase control valve (21 to 24) is switched on. Due to this, it is brought to a closed state. On the other hand, electrical current supply to the pressure-decrease control valve (25 to 28) is not carried out (i.e. maintained in a closed state). As a result, the wheel cylinder pressure is held.

In Step 340, the flag ABSF showing that ABS control is being executed is set to 1.

In the following Step 350, the pump motor 41 is switched on and the hydraulic pumps 38, 39 are operated (pumps, on) to bring about a state such that the wheel cylinder pressure can be increased.

In the following Step 360, because the wheel speed Vw is in a decreasing state and it can be considered that a slip state of the wheel is increasing, control for decreasing the wheel cylinder pressure is carried out and then the present processing is ended. Specifically, the pressure-increase control valve (21 to 24) of the control object wheel is switched on by supplying current thereby brought to a closed state. The pressure-decrease control valve (25 to 28) is switched on by supplying current thereby brought to an open state. As a result, the wheel cylinder pressure of the control object wheel is reduced.

In this way, in the ABS control of this embodiment, by adjusting the wheel cylinder pressure as described above, because the slip ratio S* is brought to a desirable range such that a large braking force can be exerted, it is possible to obtain an excellent braking performance.

Figure 8:
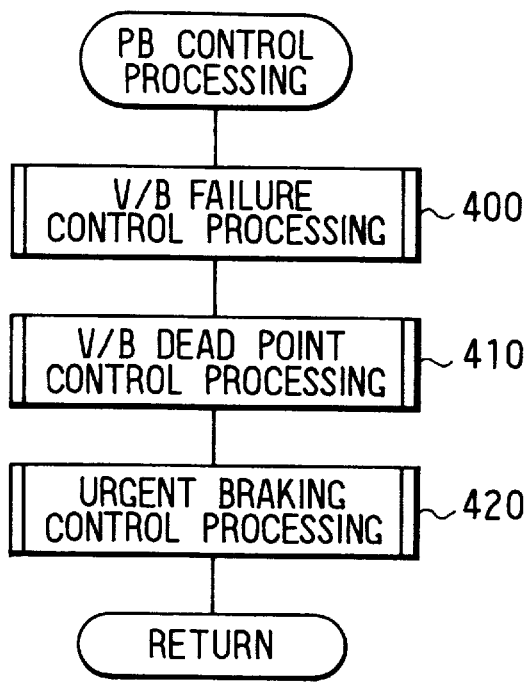
FIG. 8 is a flow chart showing power brake (PB) control processing of the first embodiment.

Next, on the basis of the flow chart of FIG. 8, the PB control processing of the above-mentioned Step 164 will be described.

This PB control (power braking control) processing is control for carrying out so-called brake assist. That is, in cases where it is not possible to secure a necessary vehicle braking force corresponding to depression of the brake pedal 3, like when for example for some reason the brake booster (brake booster V/B) 2 does not function fully, the pump motor 41 and the electromagnetic valves and so on are driven to secure a sufficient wheel cylinder pressure. As a result, the vehicle braking force can be increased and the braking distance can be shortened.

In Step 400 of FIG. 8, control of times of failure of the brake booster 2 which will be discussed later in detail is carried out.

In the following Step 410, control of when the boosting action of the brake booster 2 has reached a dead point which will be discussed later in detail is carried out.

In the following Step 420, control of times of urgent braking which will be discussed later in detail is carried out, and this processing is then once ended.

Next, on the basis of the graph of FIG. 9 and the flow chart of FIG. 10, the V/B failure control processing of the above-mentioned Step 400 will be described.

This V/B failure control processing is carried out when the boosting function of the brake booster 2 has been lost, like for example when a sufficient negative pressure (booster negative pressure) is not introduced into the negative pressure chamber 2a, to supplement that lost function.

In Step 500 of FIG. 10, it is determined whether or not the brake booster 2 has failed, according to whether or not the pressure VB1 inside the negative pressure chamber 2a detected by the pressure sensor P3 is greater than a reference value kVB (for example −1.5 atmospheres). When an affirmative determination is made, that is, when the pressure inside the negative pressure chamber 2a is larger (i.e., the negative pressure thereinside is smaller) than the reference value kVB and therefore it is determined to be a time of failure, processing proceeds to Step 510. When, on the other hand, a negative determination is made, the present processing is ended.

In Step 510, it is determined whether or not the brake switch 54 is on, and when an affirmative determination is made here processing proceeds to Step 520 and when on the other hand a negative determination is made the present processing is ended.

In Step 520, the pump motor 41 is switched on and driven.

In the following Step 530, the SMC valve (31, 32) of the control object wheel side is switched on (closed) and the SRC valve (34, 35) is switched on (open) whereby the wheel cylinder pressure is increased, and the present processing is ended.

In this way, in this processing, when failure of the brake booster 2 has been detected, the pump motor 41 is driven and the control object wheel side SMC valve 31, 32 and SRC valve 34, 35 are both switched on. Therefore, the wheel cylinder pressure is increased and a necessary braking force is secured.

Figure 9:
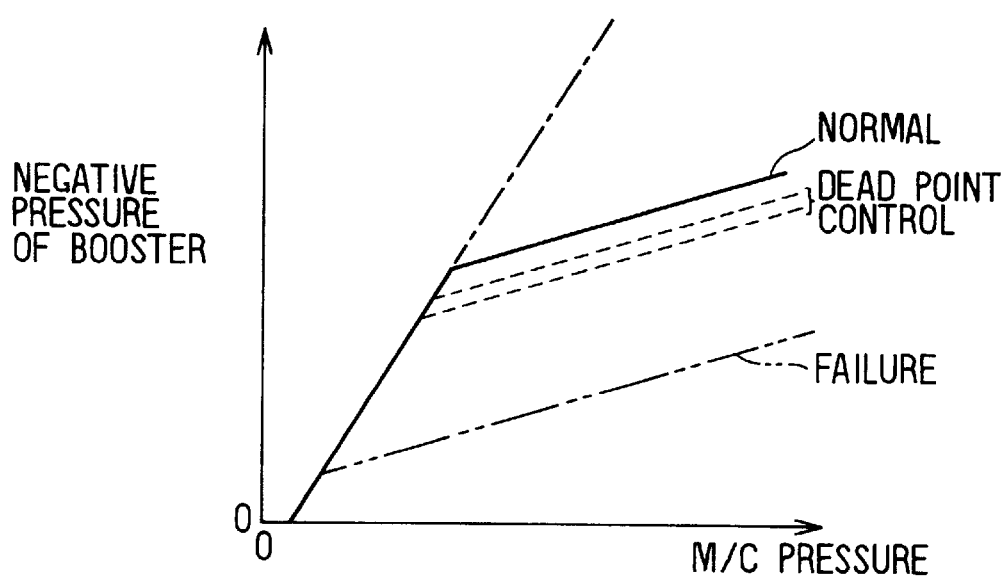
FIG. 9 is a graph showing change of brake fluid pressure caused by PB control of the first embodiment.

In other words, in this processing, at the time of a failure of the brake booster 2 as shown with the double-dash chain line of FIG. 9, although the master cylinder pressure becomes lower than normal, is it is possible to supplement the insufficient master cylinder pressure just like the normal time shown with a solid line in the same figure. Therefore, it is possible to secure a necessary wheel cylinder pressure.

Next, on the basis of the graph of FIG. 9 and the flow chart of FIG. 11, the V/B dead point control processing of the above-mentioned Step 410 will be described.

This V/B dead point control processing is processing which is carried out to supplement the function of the brake booster 2, when the booster negative pressure is deficient, for example, due to much use of pumping brakes and as a result the dead point (dead point pressure) has fallen from its normal level and the function of the brake booster 2 has decreased.

In Step 600 of FIG. 11, it is determined whether or not brake booster 2 is being used in a region above its dead point, from the relationship between the pressure (the M/C pressure) of the pressure sensor P1 which detects the master cylinder pressure and the pressure VB1 inside the negative pressure chamber 2a detected by the pressure sensor P3. Because a boosting action limit, that is, the dead point, is determined substantially proportionally by the negative pressure value of the brake booster 2, the M/C pressure arising at this boosting action limit can also be substantially inferred proportionally with respect to the negative pressure. Specifically, it is determined whether or not (M/C pressure)/VB1 is greater than a reference value k. Here, the magnitude of the pressure is compared as an absolute value.

In other words, when the brake booster 2 is normal, the relationship between the booster negative pressure VB1 and the master cylinder pressure come to have the relationship shown by the solid line of FIG. 9. However, when the booster pressure VB1 has fallen, for example, due to much use of pumping, they comes to have the relationship shown with the dotted lines of the same figure. Because the intersection between the dotted line and the solid line is the boosting action limit (dead point), this dotted line part is a region above the dead point and is a region simply operated by increased depression of the brake pedal 3 (no boosting action is working).

Here, when an affirmative determination is made, that is, when it is determined to be a state such that an M/C pressure greater than the M/C pressure corresponding to the dead point of the brake booster 2 has been produced by the master cylinder and the boosting action of the brake booster 2 does not contribute to further increases of the M/C pressure, processing proceeds to Step 610. When, on the other hand, a negative determination is made, the present processing is ended.

In Step 610, it is determined whether or not the brake switch 54 is on, and when an affirmative determination is made here processing proceeds to Step 620. When, on the other hand, a negative determination is made the present processing is ended.

In Step 620 the pump motor 41 is switched on and driven.

In the following Step 630, the opening and closing of the SMC valve (31, 32) of the control object wheel side is duty controlled and the supply of current to the SRC valve (34, 35) is switched on to open the hydraulic passage. As a result, the wheel cylinder pressure is gradually increased (pulse pressure increase) and the present processing is ended.

In this way, in this processing, when a fall in the function of the brake booster 2 has been detected, the pump motor 41 and the SRC valve (34, 35) is switched on. Also, by the SMC valve (31, 32) being duty controlled, the wheel cylinder pressure is gradually increased and a necessary braking force can be secured.

To effect a more certain determination, for example immediately after the above-mentioned Step 600, a determination of whether or not the rate of change of the master cylinder pressure (dM/C pressure) is greater than a reference value k' may be inserted. When an affirmative determination is made in such a step, processing may proceed to Step 610 and the followings. In other words, this determination is for detecting a state such that the rate of increase of the M/C pressure is large and the boosting effect of the brake booster 2 is working.

Next, on the basis of the graph of FIG. 9 and the flow chart of FIG. 12, the urgent braking control processing of the above-mentioned Step 420 will be described.

This urgent braking control processing is control carried out in cases such as when a sufficient braking force cannot be obtained because the amount of depression of the brake pedal 3 cannot be held sufficiently due to the pedal reaction or the amount of depression is insufficient even during urgent braking. According to this urgent braking control processing, a large wheel cylinder pressure or a large wheel cylinder pressure increase gradient can be obtained to thereby increase the braking performance.

Figure 12:
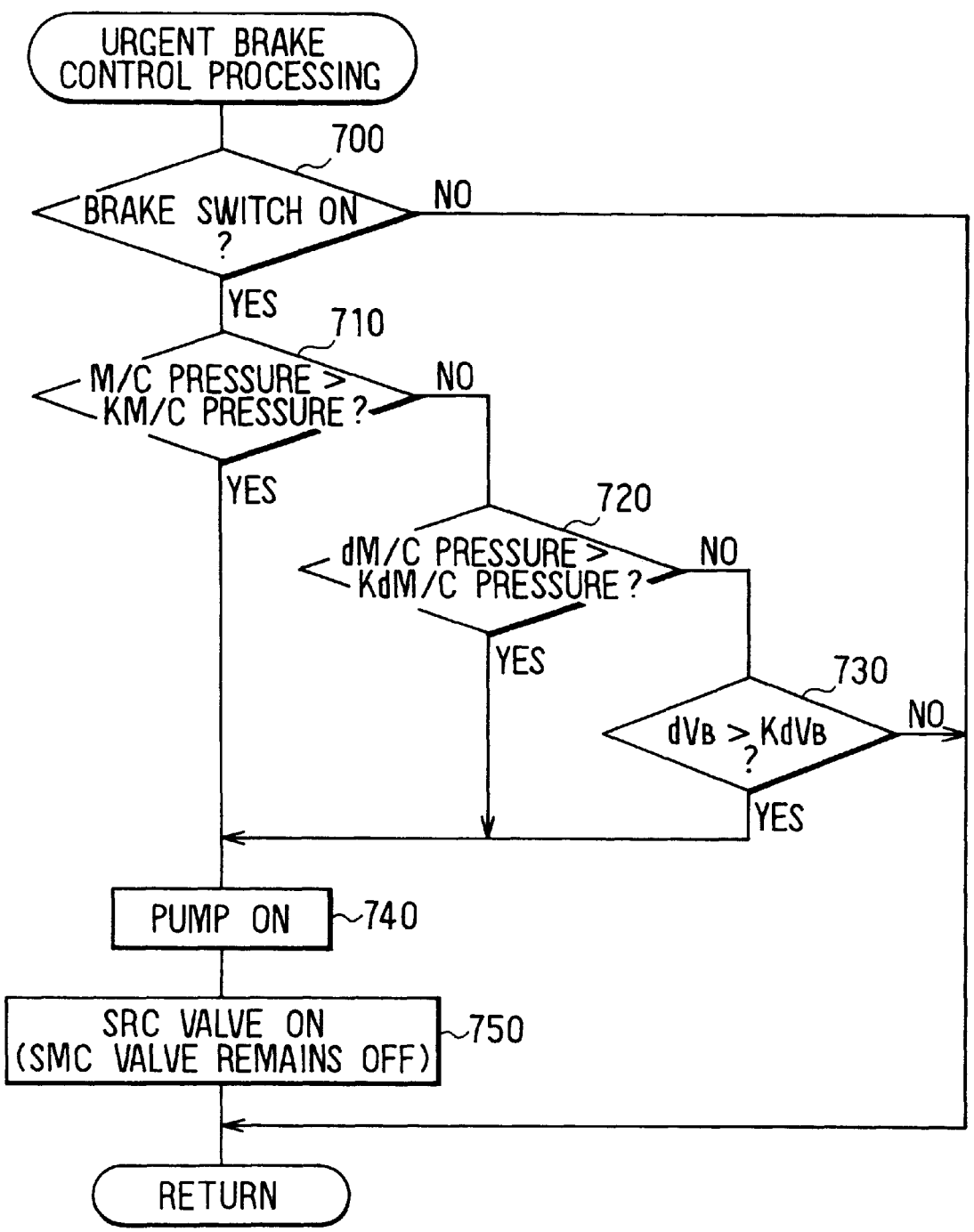
FIG. 12 is a flow chart showing urgent braking control processing of the first embodiment.

First, in Step 700 of FIG. 12, it is determined whether or not the brake switch 54 is on. When here an affirmative determination is made processing proceeds to Step 710, and when on the other hand a negative determination is made the present processing is ended.

In Step 710, whether or not it is an urgent braking state is determined according to, for example, whether or not the master cylinder pressure (M/C pressure) is greater than a reference value (kM/C pressure). When here an affirmative determination is made processing proceeds to Step 740, and when on the other hand a negative determination is made processing proceeds to Step 720.

In Step 720, in the same way, whether or not it is an urgent braking state is determined according to, for example, whether or not the rate of change of the master cylinder pressure (dM/C pressure) is greater than a reference value (dkM/C pressure). That is, an urgent depression state of the brake pedal is detected. When here an affirmative determination is made processing proceeds to Step 740, and when on the other hand a negative determination is made processing proceeds to Step 730.

In Step 730 also, whether or not it is an urgent braking state is determined according to, for example, whether or not the vehicle body deceleration dVB is greater than a reference value (kdVB). When here an affirmative determination is made processing proceeds to Step 740, and when on the other hand a negative determination is made the present processing is ended.

In Step 740, to which processing proceeds when it is determined to be an urgent braking state in any of Steps 710, 720, 730, the pump motor 41 is switched on.

In the following Step 750, the SRC valves 34, 35 are switched on (open). By this means, the wheel cylinder pressure is increased and the braking force can be raised. However, in the case of this processing, because the brake booster 2 is normal, the SMC valves 31, 32 are left off (open). Because an urgent braking state is determined from the M/C pressure, M/C pressure change rate or vehicle body deceleration, in a case of disorder or failure of the brake booster 2, it is not possible to detect an urgent braking state. In other words, when the urgent braking state has been detected, it can be considered that the brake booster 2 is normal. Urgent braking operation at a time of failure of the brake booster 2 can be supplemented by the above-mentioned control on failure (FIG. 10).

In this way, when it has been detected that it is an urgent braking state, in addition to the normal boosting action of the brake booster 2, the pump motor 41 is operated to supply brake fluid from a master cylinder side to a wheel cylinder side. Therefore, it is possible to raise the wheel cylinder pressure more so that it lies in a region on the left side of the solid line from the 0 point in FIG. 9 and the single-dash chain line on the straight line of this solid line. By this means, it is possible to secure a high braking force during urgent braking.

Next, on the basis of the flow chart of FIG. 13, turning control processing of the above-mentioned Step 170 will be described.

This turning control processing is processing attempting to stabilize vehicle behavior (so-called processing of turning line trace control with which the vehicle can turn with a desired line to be traced) on turning on the basis of results of the turning state detection processing of the above-mentioned Step 160.

Figure 13:
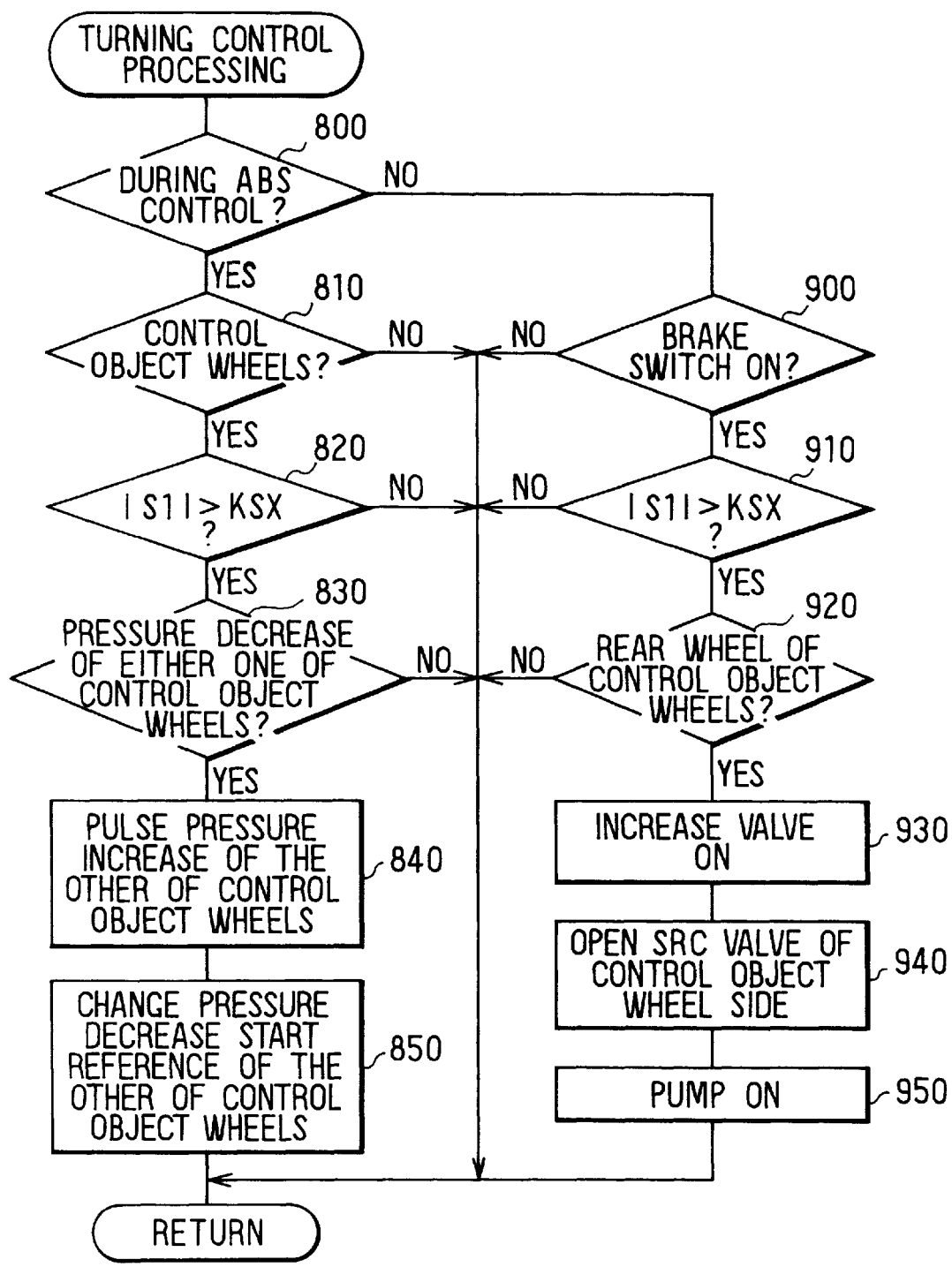
FIG. 13 is a flow chart showing turning control processing of the first embodiment.

In Step 800 of FIG. 13, it is determined whether or not anti-skid (ABS) control is in progress. For example, when the brake pedal 3 is depressed so that the brake switch 54 becomes on and the slip ratio S* becomes larger than a start reference which is a reference for starting ABS control, it is determined that ABS control has been started and in progress. The determination may alternatively be carried out using the above-mentioned flag ABSF. When here an affirmative determination is made, processing proceeds to Step 810 and when on the other hand a negative determination is made processing proceeds to Step 900. In Step 900 and the followings, processing during absence of ABS control, which will be discussed later, is carried out.

In Step 810, it is determined whether or not the wheels for which processing is currently being carried out are control object wheels. That is, it is determined whether or not the wheels are the front left wheel FL and the rear right wheel RR during right turning obtained in the above-mentioned Step 240 or the front right wheel FR and the rear left wheel RL during left turning obtained in Step 250. When here an affirmative determination is made processing proceeds to Step 820, and when on the other hand a negative determination is made the present processing is ended.

In Step 820, it is determined whether or not the absolute value |S1| of the difference S1 between the squares of the wheel speeds of the left and right wheels is greater than a reference value kSX. That is, when the difference between the wheel speeds of the left and right wheels is large, it can be considered that the vehicle is during sharp turning. Because the vehicle behavior readily becomes unstable during sharp turning, here, it is determined whether or not the turning state is sharper than a predetermined level. When here an affirmative determination is made processing proceeds to Step 830, and when on the other hand an negative determination is made the present processing is ended.

In Step 830, it is determined whether or not the wheel cylinder pressure of either one of the control object wheels is being controlled to a reduced pressure by ABS control. When here an affirmative determination is made processing proceeds to Step 840, and when on the other hand a negative determination is made the present processing is ended.

In Step 840, control (for example pulse pressure increase) to increase the wheel cylinder pressure of the control object wheel for which pressure-decreasing control is not being carried out is carried out.

In the following Step 850, processing to increase the start reference for starting pressure-decrease control of ABS control with respect to the control object wheel being pressure-increased to a start reference kS2 is carried out so that that control object wheel is difficult to enter pressure-decrease control of ABS control. For example, when the normal pressure-decrease start reference kS1 is set to a wheel slip ratio of 6%, processing increasing it to 20% is carried out, and this processing is then once ended. After the change to this pressure-decrease start reference kS2 is carried out, when a predetermined time elapses, the pressure-decrease start reference is returned to the original value.

In the flow chart of FIG. 6, when turning state detection processing is carried out, alternatively, after Step 240 and Step 250, a step of detecting whether or not the difference S1 has become smaller than the predetermined value kSX may be inserted. After it has been confirmed that the turning state has fallen below a predetermined level corresponding to the predetermined value kSX, the pressure-decrease start reference kS2 may be returned to the pressure-decrease start reference kS1.

Here, the effects of the processing of Steps 830 to 850 carried out on the above-mentioned control object wheels will be explained.

Figure 14:
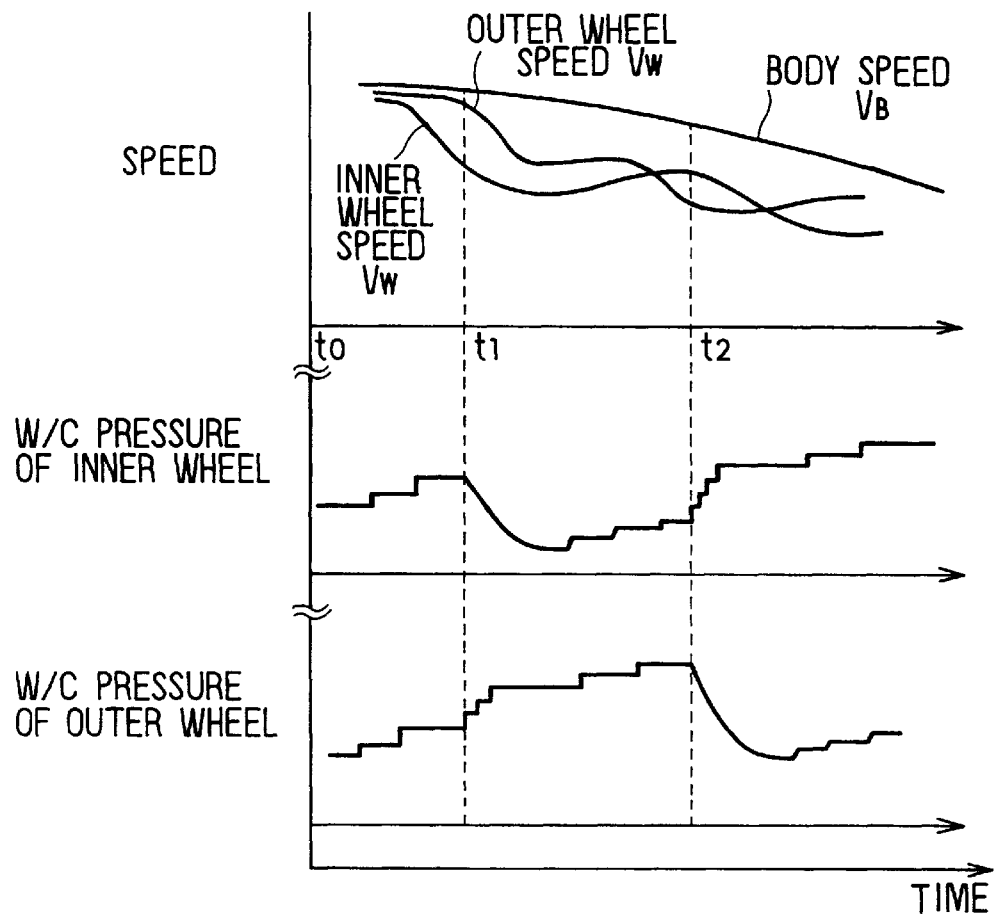
FIG. 14 is a time chart showing change of brake fluid pressure caused by control of the first embodiment.
Figure 15:
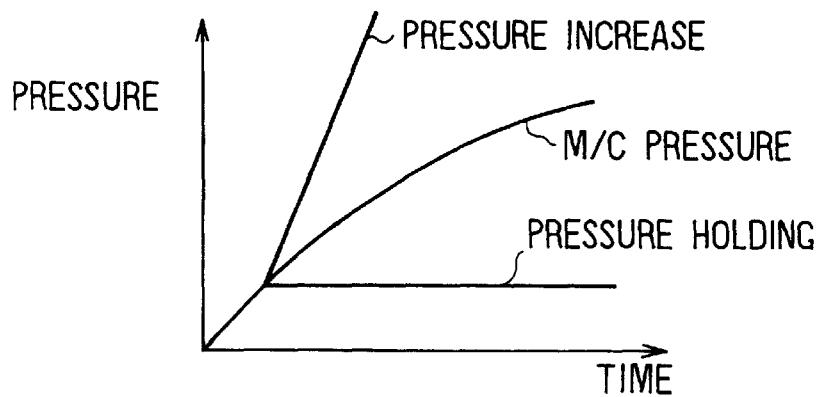
FIG. 15 is a graph showing change of brake fluid pressure caused by control of the first embodiment.

For example, at a time of turning braking as shown in FIG. 14, when the wheel speed Vw of the inner side wheel falls from the vehicle body speed VB and the slip ratio of the inner side wheel becomes large at the time point t1, the side force of the inner wheel falls so that the spin tendency thereof becomes large. Consequently, control for reducing the wheel cylinder pressure of that inner side wheel is carried out by ABS control.

When this pressure-reduction of the inner side wheel is detected by the determination of the above-mentioned Step 830, the wheel cylinder pressure of the other wheel (in this case, the outer side wheel on the diagonal line from the inner side wheel) is increased in Steps 840, 850.

Figure 1:
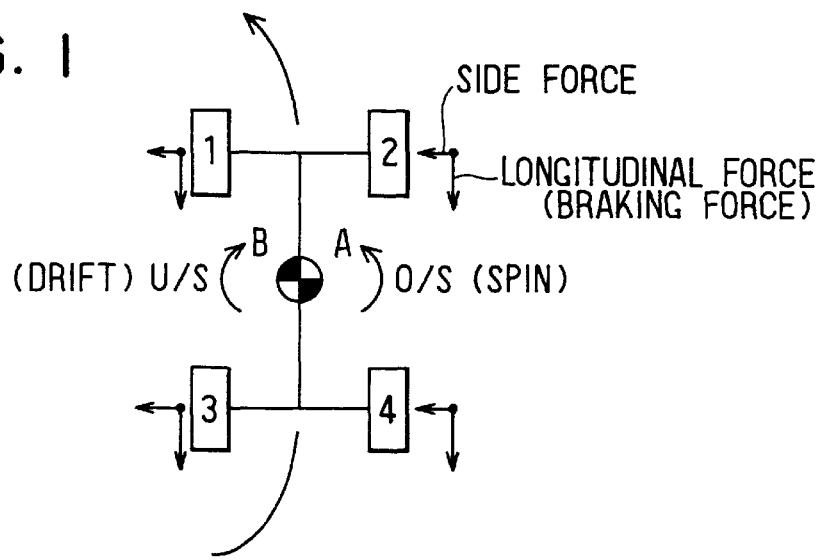
FIG. 1 is an explanatory view illustrating the operation of the present invention.
Figure 2A:
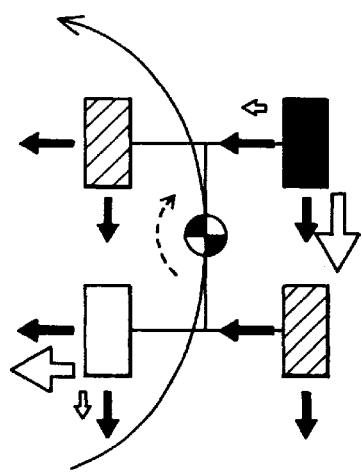
FIG. 2A is an explanatory view showing anti-spin control.

That is, for example as shown in the above-mentioned FIG. 2A, in the case of left turning, when the inner side rear wheel has been pressure-decreased, the outer side front wheel, which is the other control object wheel, is pressure-increased. By this means, as shown in the above-mentioned Table 1, whereas the current state is in a spin tendency, forces ①, ② for creating a U/S tendency can be applied to both control object wheels on the diagonal line. Therefore, it is possible to prevent the occurrence of spin.

On the other hand, when the slip ratio of the outer side wheel becomes large at the time point t2, the side force on the outer side wheel falls and the drift tendency becomes large. In this case, reversely, control for reducing the wheel cylinder pressure of this outer side wheel is carried out.

When pressure-reducing control of the outer side wheel is detected by the determination of the above-mentioned Step 830, the wheel cylinder pressure of the other wheel (in this case, the inner side wheel on the diagonal line) is pressure-increased in Steps 840, 850.

Figure 2B:
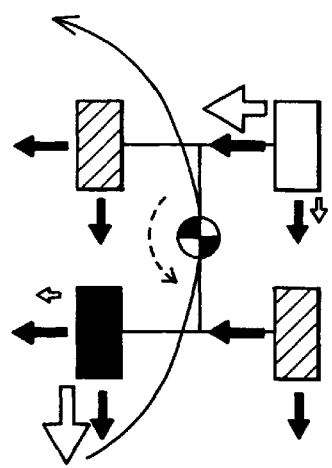
FIG. 2B is an explanatory view showing anti-drift control.

That is, for example as shown in the above-mentioned FIG. 2B, in the case of left turning, when the outer side front wheel is pressure-decreased, the inner side rear wheel is pressure-increased.

By this means, as shown in the above-mentioned Table 1, whereas the current state is in a drift tendency, it is possible to apply forces ③, ④ for creating an O/S tendency. Therefore, it is possible to prevent the occurrence of drift.

Returning to FIG. 13, when in the above-mentioned Step 800, a negative determination is made, because ABS control is not in progress, processing during absence of ABS control is carried out.

First, in Step 900, whether or not the brake pedal 3 has been depressed is determined according to whether or not the brake switch 54 is on. When here an affirmative determination is made processing proceeds to Step 910, and when on the other hand a negative determination is made the present processing is ended.

In Step 910, in the same way as the above-mentioned Step 820, it is determined whether or not the absolute value |S1| of the difference S1 between the squares of the wheel speeds of the left and right wheels is greater than the reference value kSX. That is, it is determined whether or not it is a sharp turn. When here an affirmative determination is made processing proceeds to Step 920, and when on the other hand a negative determination is made the present processing is ended.

In Step 920, it is determined whether or not the wheel for which control processing is currently being carried out is the rear wheel of the control object wheels. When here an affirmative determination is made processing proceeds to Step 930, and when on the other hand a negative determination is made the present processing is ended.

In Step 930, the pressure-increase control valve 22 or 23 corresponding to this rear wheel of the control object wheels is switched on and its flow path thereby closed. As a result, control to hold the wheel cylinder pressure so that it is not allowed to increase further than that is thereby carried out.

In the following Step 940, the SRC valve 34 or 35 on a side of the rear wheel of the control object wheels is switched on, and control to open that flow path is carried out.

In the following Step 950, the pump motor 41 is switched on and the hydraulic pump 38 or 39 is driven. In this way, processing for increasing the wheel cylinder pressure of the other wheel belonging to the same first or second hydraulic pipe arrangement 11a or 11b (the front wheel of the control object wheels) is carried out and this processing is then once ended.

In other words, because the pressure-increase control valve 22 or 23 of the rear wheel of the control object wheels has been switched on, a predetermined wheel cylinder pressure is maintained. However, with the pressure-regulating valve (the reverse-connected proportional control valve) 42 or 43 disposed, by driving the hydraulic pump 38 or 39, only the wheel cylinder pressure of the other wheel increases.

Therefore, for example during left turning, while the wheel cylinder pressure of the rear wheel of the control object wheels (i.e. the turn inner wheel side rear wheel) is maintained, the wheel cylinder pressure of the outer side front wheel is increased. Consequently, the braking force increases and the slip tendency increases with the result that the side force falls. Thus, it is possible to effectively prevent the occurrence of spin.

At times other than during this ABS control, the wheel cylinder pressure of the rear wheel is maintained. However, since as shown in FIG. 15 the master cylinder pressure (M/C pressure) increases as a result of depression of the brake pedal 3 during this time, considering with the master cylinder pressure as a reference, the wheel cylinder pressure of the rear wheel of the control object wheels is decreased and the wheel cylinder pressure of the front wheel of the control object wheels is increased.

In this way, in this embodiment, when the brake pedal 3 has been depressed during turning, if ABS control is in progress, in the control object wheels, the wheel cylinder pressure of the wheel positioned diagonally opposite to the wheel which is pressure-decrease controlled is increased. Therefore, it is possible to effectively prevent the occurrence of spin and drift. By this means, it is possible to prevent the vehicle behavior from becoming unstable.

Also, in this embodiment, even when it is not during ABS control, when the brake pedal 3 has been depressed during turning, the wheel cylinder pressure of the rear wheel of the control object wheels is maintained and the wheel cylinder pressure of the front wheel positioned diagonally opposite to that rear wheel is increased. Consequently, it is possible to effectively prevent spin. By this means, it is possible to prevent the vehicle behavior becoming unstable.

(Second Embodiment)

Next, a second embodiment will be described.

Because in this embodiment only turning control processing is different from Embodiment 1, and the other hardware construction and control processing are the same, the turning control processing only will be described.

Figure 16:
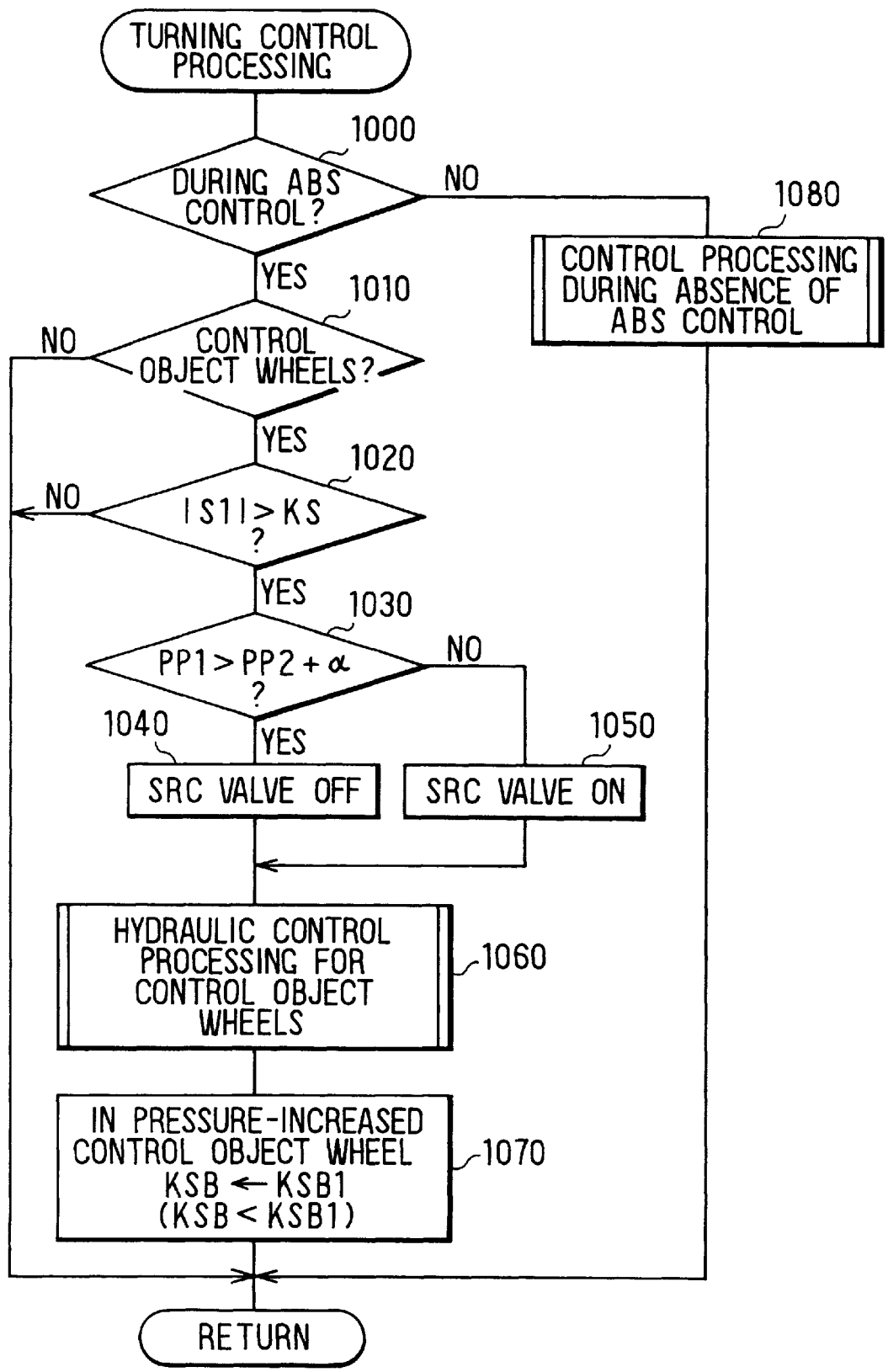
FIG. 16 is a flow chart showing turning control processing of a second embodiment.

As shown in the flow chart of FIG. 16, in this turning control processing, first, in Step 1000, whether or not ABS control is in progress is determined for example according to whether or not the above-mentioned flag ABSF is 1. When here an affirmative determination is made processing proceeds to Step 1010, and when on the other hand a negative determination is made processing during absence of ABS control which will be discussed in detail later is carried out.

In the following Step 1010, it is determined whether or not the wheels for which control processing is currently being carried out are control object wheels. That is, it is determined whether or not they are the front left wheel FL and the rear right wheel RR during right turning obtained in the above-mentioned Step 240 or the front right wheel FR and the rear left wheel RL during left turning obtained in Step 250. When here an affirmative determination is made processing proceeds to Step 1020, and when on the other hand a negative determination is made the present processing is ended.

In Step 1020, it is determined whether or not the absolute value |S1| of the difference S1 between the squares of the wheel speeds of the left and right wheels is greater than the reference value kSX. That is, when the difference between the wheel speeds of the left and right wheels is large, it is considered that the vehicle is in sharp turning. Because the vehicle behavior readily becomes unstable during sharp turning, it is determined whether or not the turning is sharper than a predetermined level. When here an affirmative determination is made processing proceeds to Step 1030, and when on the other hand a negative determination is made the present processing is ended.

In Step 1030, it is determined whether or not the master cylinder pressure (M/C pressure: PP1) detected by the pressure sensor P1 is greater than a value obtained by adding a predetermined pressure α to the wheel cylinder pressure (W/C pressure: PP2) detected by the pressure sensor P2. That is, it is determined whether or not there is a pressure difference between the M/C pressure and the W/C pressure. When here an affirmative determination is made processing proceeds to Step 1040, and when on the other hand a negative determination is made processing proceeds to Step 1050.

In Step 1040, the SRC valve 34 or 35 remains off (close). This is because the M/C pressure is higher than the wheel cylinder pressure by more than a predetermined pressure α, and an increase in the wheel cylinder pressure can be sufficiently realized by means of the M/C pressure. In other words, it is unnecessary for the hydraulic pumps 38, 39 to draw brake fluid through the SRC valves 34, 35 from the master cylinder side and to supply that brake fluid to the wheel cylinders. At this time, the pump motor 41 is in the on-state as a result of the start of ABS control as mentioned above.

In Step 1050, because there is not the above-mentioned pressure difference, the SRC valve 34, 35 of the control object wheel side is switched on (open). At this time also, the pump motor 41 is in the on-state.

In the following Step 1060, hydraulic pressure control processing of the control object wheels, which will be discussed in detail later, is carried out.

In the following Step 1070, a reference value kSB in the control object wheel to be pressure-increased is set to a large value kSB1, and the present processing is ended. That is, the slip ratio which is the pressure-decrease start reference for starting pressure-decrease control of ABS control is made large, and pressure-decreasing during ABS control is thereby made to start less readily (or its starting is essentially prohibited).

Figure 17A:
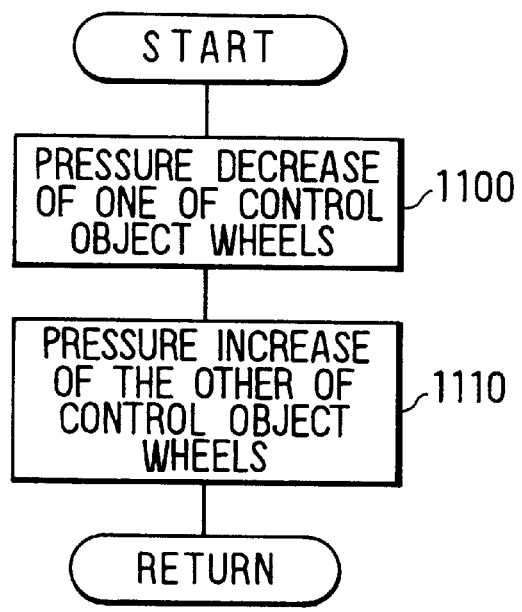
FIG. 17 is a flow chart showing hydraulic pressure control processing with respect to a control object wheel according to the second embodiment.

Next, the hydraulic pressure control processing of the control object wheels of the above-mentioned Step 1060 will be described on the basis of the flow chart of FIG. 17A.

In this processing, because already the conditions for implementing turning control have been satisfied, the brake fluid pressures in the control object wheels are controlled, to stabilize the vehicle behavior on turning.

First, in Step 1100, the wheel cylinder pressure of one of the control object wheels is decreased. Specifically, from the principles explained with the above-mentioned Table 1, for example in the case of left turning, anti-spin control can be carried out by ① increasing the pressure of the outer side front wheel of turning and ② decreasing the pressure of the inner side rear wheel of turning. On the other hand, anti-drift control can be carried out by ③ increasing the pressure of the inner side rear wheel of turning and ④ decreasing the pressure of the outer side front wheel of turning. That is, according to the turning state, pressure-decrease of the necessary side is carried out.

In the following Step 1110, the wheel cylinder pressure of the other of the control object wheels is increased, and the present processing is ended. In this case, pressure-increasing is carried out with the amount of brake fluid of the pressure decrease of the above-mentioned Step 1100.

By this means, it is possible to prevent the occurrence of spin and drift and to stabilize the vehicle behavior.

Figure 17B:
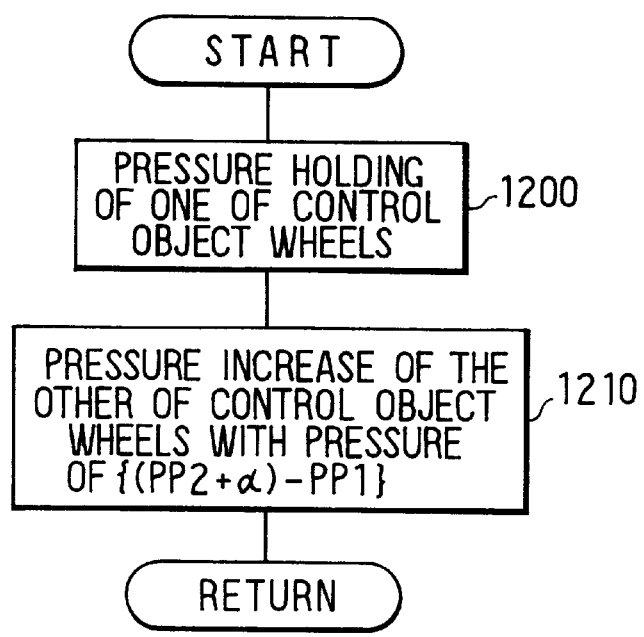

Also, instead of the processing of the above-mentioned Steps 1100, 1110, the following processing shown in the flow chart of FIG. 17B can be employed.

That is, first, in Step 1200, the wheel cylinder pressure of one of the control object wheels is held.

In the following Step 1210, the wheel cylinder pressure of the other control object wheel is increased, and the present processing is ended. In this case, an hydraulic pressure of the amount {(PP2+α)−PP1} is increased.

By this means also, in the same way as that described above, it is possible to prevent the occurrence of spin and drift and to stabilize the vehicle behavior.

That is, as described above on the basis of FIG. 16 and FIG. 17, in this processing, even if ABS control is in progress, when the conditions for implementing turning control have been satisfied, turning control is implemented preferentially to ABS control. Consequently, it is possible to stabilize the vehicle behavior on turning.

That is, when turning control and ABS control are both carried out, in relation to the wheel cylinder pressure of the control object wheels, for example conflicting commands of pressure-decrease and pressure-increase will be made. As a result, good vehicle control may not be carried out. To overcome this, in this embodiment, by carrying out turning control preferentially, turning control can be carried out desirably.

In this case, after turning control is ended, when the conditions of ABS control have been satisfied, ABS control may be carried out as normal (returning the pressure-decrease start reference to its original value), or the ABS control may remain suspended.

Figure 18:
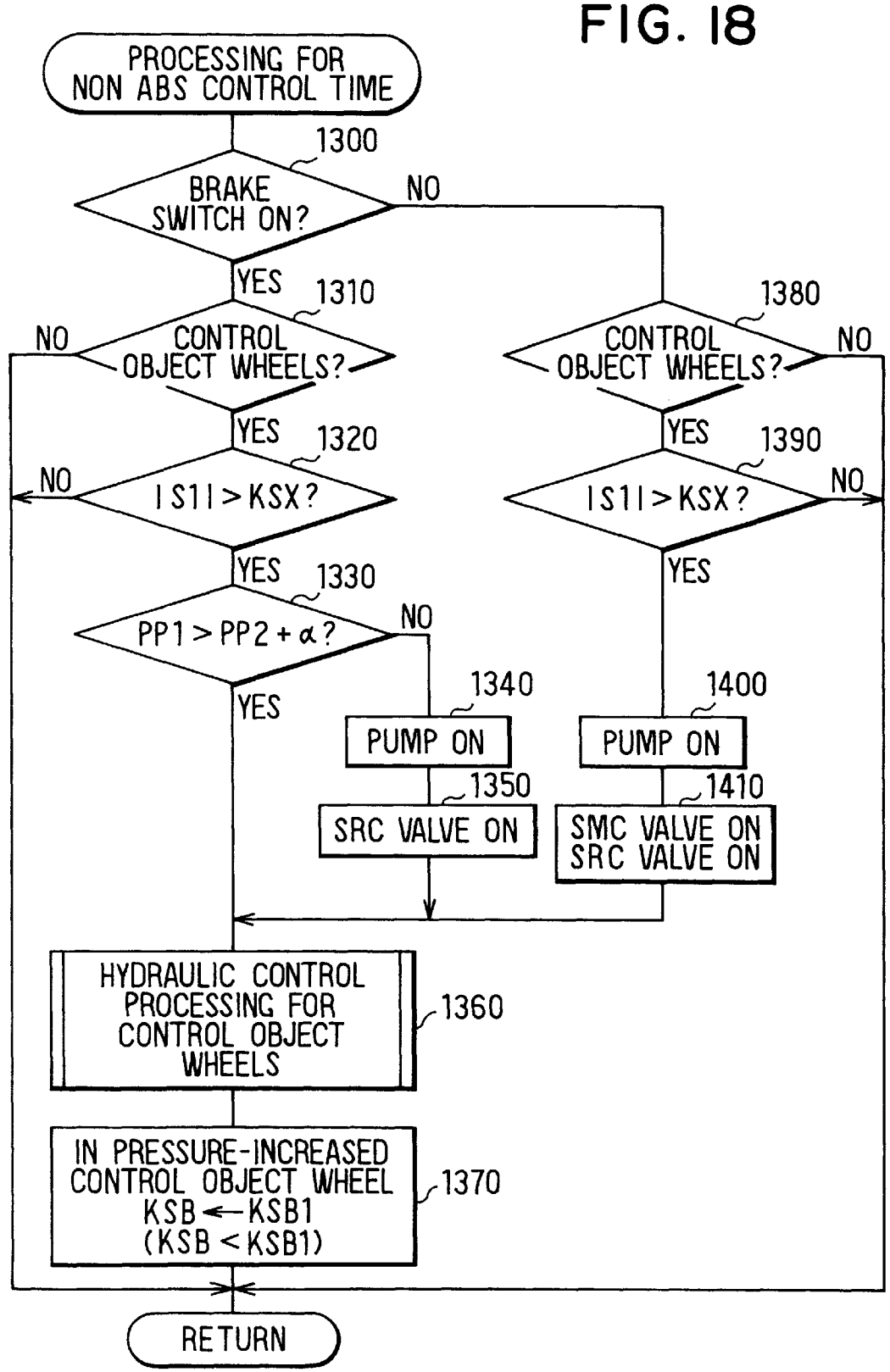
FIG. 18 is a flow chart showing processing of not during ABS control of the second embodiment.

Next, the processing during absence of ABS control of the above-mentioned Step 1080 will be described on the basis of the flow chart of FIG. 18.

In Step 1300, it is determined whether or not the brake switch 54 is on. When here an affirmative determination is made processing proceeds to Step 1310, and when on the other hand a negative determination is made processing proceeds to Step 1380.

In Step 1310, as in the above-mentioned Step 1010, it is determined whether or not the wheels for which control processing is currently being carried out is control object wheels. When here an affirmative determination is made processing proceeds to Step 1320, and when on the other hand a negative determination is made the present processing is ended.

In Step 1320, as in the above-mentioned Step 1020, it is determined whether or not the absolute value |S1| of the difference S1 between the squares of the wheel speeds of the left and right wheels is greater than the reference value kSX. When here an affirmative determination is made processing proceeds to Step 1330, and when on the other hand a negative determination is made the present processing is ended.

In Step 1330, as in the above-mentioned Step 1030, it is determined whether or not the M/C pressure (M/C pressure: PP1) is greater than a value obtained by adding a predetermined pressure α to the wheel cylinder pressure (W/C pressure: PP2). When here an affirmative determination is made processing proceeds to Step 1360, and when on the other hand a negative determination is made processing proceeds to Step 1340.

In Step 1340, the pump motor 41 is switched on.

In the following Step 1350, the control object wheel side SRC valve 34, 35 is brought to an on (open) state.

In the following Step 1360, as in the above-mentioned Step 1060, hydraulic pressure control processing of the control object wheels described above is carried out.

In the following Step 1370, as in the above-mentioned Step 1070, the reference value kSB in the control object wheel to be pressure increased is set to a large value kSB1, and the present processing is ended.

In Step 1380 to which processing proceeds when a negative determination is made in the above-mentioned Step 1300, on the other hand, as in the above-mentioned Step 1310, it is determined whether or not the wheels for which control processing is currently being carried out is control object wheels. When here an affirmative determination is made processing proceeds to Step 1390, and when on the other hand a negative determination is made the present processing is ended.

In Step 1390, as in the above-mentioned Step 1320, it is determined whether or not the absolute value |S1| of the difference S1 between the squares of the wheel speeds of the left and right wheels is greater than the reference value kSX. When here an affirmative determination is made processing proceeds to Step 1400, and when on the other hand a negative determination is made the present processing is ended.

In Step 1400, the pump motor 41 is switched on.

In the following Step 1410, the control object wheel side SMC valve 31, 32 is switched on (closed), and the SRC valve 34, 35 is brought to the on (open) state. As a result a state wherein the pressure can be increased irrespective of the master cylinder pressure is reached.

After that, processing of the above-mentioned Step 1360, Step 1370 is gone through and the present processing is ended.

In this way, at times of not ABS control, when conditions of executing turning control have been satisfied, the wheel cylinder pressures of the control object wheels are suitably controlled and it is possible to prevent spin and drift.

This invention is not limited to the embodiments described above, and it goes without saying that as long as they do not deviate from the technological scope of the invention it can be worked in various forms.

(1) In the embodiments described above, an X pipe arrangement was taken as an example, but it is clear that the invention can be also applied to a front-rear pipe arrangement.

(2) In the embodiments described above, turning control during ABS control and turning control at times other than during ABS control were both carried out, but either one of these alone may be carried out.

(3) Also, a brake control apparatus carrying out turning control during ABS control and a brake control apparatus carrying out turning control at times other than during ABS control may be separately constructed.

For example, when turning control during ABS control is carried out, the construction of the control apparatus may be simplified. That is, a construction capable of carrying out ordinary ABS control with respect to predetermined wheels is sufficient, and a simple construction wherein there are not pressure-regulator valve and SMC valves and SRC valves can also be employed.

Also, as an apparatus for carrying out turning control at times other than during ABS control, an apparatus having a pressure-regulator valve was given as an example. In this apparatus, the SMC valves can be dispensed with. Or, the pressure-regulator valve can be dispensed with and pressure-increasing can be carried out by the SMC valves being closed and the pump being driven.

(4) As the means for detecting the turning state, an acceleration sensor for sensing lateral acceleration or a yaw sensor or a steering wheel angle sensor or the like may be used.

(5) In the second embodiment, upon the start of turning control, ABS control was stopped for all the wheels. However, for example ABS control of the front wheels only may be stopped. In that case, controllability due to ABS control can be somewhat secured, and it is possible to secure braking force while maintaining straight line stability with ABS control of the rear wheel side. turning braking stability can be secured with turning control of the front wheel side.

What is claimed is:

1. A brake control apparatus in a vehicle comprising:

wheel braking force producing devices for producing wheel braking force in front and rear wheels during braking of the vehicle;

a brake fluid pressure producing device for producing brake fluid pressure applied to the wheel braking force producing devices;

specifying means for detecting a turning state of the vehicle and specifying one of a front wheel and a rear wheel of the vehicle, the front wheel being the outer side wheel of the vehicle relative to a turning direction of the vehicle and the rear wheel being an inner side wheel of the vehicle relative to the turning direction of the vehicle; and turning control means for controlling, when the turning state of the vehicle satisfies a predetermined condition, the brake fluid pressure producing device to reduce the applied brake fluid pressure to the wheel braking force producing device of a first wheel of the specified front wheel and rear wheel and substantially simultaneously controlling the brake fluid pressure producing device to increase the applied brake fluid pressure to the wheel braking force producing device of the second wheel of the specified front wheel and rear wheel;

wherein, the brake fluid pressure of the wheel braking force producing device of said first wheel is decreased by reducing a predetermined amount of brake fluid therefrom and the brake fluid pressure of the wheel braking force device of said second wheel is increased by adding thereto an amount of brake fluid equivalent to the predetermined amount of brake fluid reduced from the wheel braking force producing device of said first wheel.

2. A brake control apparatus for a vehicle comprising:

wheel braking force producing devices for producing wheel braking force in front and rear wheels during braking of the vehicle;

a brake fluid pressure producing device for producing brake fluid pressure applied to the wheel braking force producing devices;

specifying means for detecting a turning state of the vehicle and specifying one of a front wheel and a rear wheel of the vehicle, the front wheel being the outer side wheel of the vehicle relative to a turning direction of the vehicle and the rear wheel being an inner side wheel of the vehicle relative to the turning direction of the vehicle; and turning control means for controlling, when the turning state of the vehicle satisfies a predetermined condition, the brake fluid pressure producing device to hold constant the applied brake fluid pressure to the wheel braking force producing device of a first wheel of the specified front wheel and rear wheel and substantially simultaneously controlling the brake fluid pressure producing device to increase the applied brake fluid pressure to the wheel braking force producing device of the second wheel of the specified front wheel and rear wheel.

3. A brake control apparatus according to claim 1 or 2, further comprising, slip state detecting means for detecting respective slip states of the first and second wheels; and anti-skid controlling means for adjusting respectively the brake fluid pressure of the braking force producing devices of the first and second wheels based on brake fluid pressure initially applied by the brake fluid pressure producing device when the slip states of the first and second wheels satisfy respective predetermined conditions for executing anti-skid control; and wherein, when the turning control means is controlling the brake fluid pressure producing device, the anti-skid control execution by the anti-skid controlling means is suspended.

4. A brake control apparatus according to claim 3, wherein the anti-skid control is suspended with respect to the outer side front wheel.

5. A brake control apparatus of a vehicle comprising:

wheel braking force producing devices for producing wheel braking force in front and rear wheels during braking of the vehicle;

a brake fluid pressure producing device for producing a first brake fluid pressure applied to the wheel braking force producing devices;

specifying means for detecting a turning state of the vehicle and specifying one of a front wheel and a rear wheel of the vehicle, the front wheel being the outer side wheel of the vehicle relative to a turning direction of the vehicle and the rear wheel being an inner side wheel of the vehicle relative to the turning direction of the vehicle; and slip state detecting means for detecting respectively slip states of a first wheel of the specified front and rear wheels and a second wheel of the specified front and rear wheels;

anti-skid controlling means for adjusting respectively the brake fluid pressure of the braking force producing devices of the first and second wheels based on the first brake fluid pressure applied thereto when the slip states of the first and second wheels satisfy respective predetermined conditions for executing anti-skid control; and a turning control means for controlling the brake fluid pressure producing device to increase the applied brake fluid pressure to the wheel braking force producing device of the second wheel to a brake fluid pressure larger than the first brake pressure immediately after the anti-skid controlling means starts reducing the brake fluid pressure of the wheel braking force producing device of the first wheel.

6. A brake control apparatus according to any one of claims 1, 2 and 5, wherein said wheel braking force producing devices comprise:

a first wheel braking force producing device for producing a wheel braking force in a front right wheel on vehicle braking;

a second wheel braking force producing device for producing a wheel braking force in a front left wheel on vehicle braking;

a third wheel braking force producing device for producing a wheel braking force in a rear right wheel on vehicle braking; and a fourth wheel braking force producing device for producing a wheel braking force in a rear left wheel on vehicle braking, and further comprising:

a first pipe system which connects the brake fluid pressure producing device to both the first wheel braking force producing device and the second wheel braking force producing device; and a second pipe system which connects the brake fluid pressure producing device to both the third wheel braking force producing device and the fourth wheel braking force producing device.

7. A brake control apparatus according to any one of claims 1, 2, and 5, wherein said wheel braking force producing devices comprise:

a first wheel braking force producing device for producing a wheel braking force in a front right wheel on vehicle braking;

a second wheel braking force producing device for producing a wheel braking force in a front left wheel on vehicle braking;

a third wheel braking force producing device for producing a wheel braking force in a rear right wheel on vehicle braking; and a fourth wheel braking force producing device for producing a wheel braking force in a rear left wheel on vehicle braking, and further comprising:

a first pipe system which connects the brake fluid pressure producing device to both the first wheel braking force producing device and the fourth wheel braking force producing device; and a second pipe system which connects the brake fluid pressure producing device to both the second wheel braking force producing device and the third wheel braking force producing device.

8. A brake control apparatus according to claim 5, wherein, when the brake fluid pressure of the wheel braking force producing device of the second wheel is increased by the turning control means, a threshold of the predetermined conditions for executing anti-skid control with respect to said second wheel is changed to a larger value so that starting the anti-skid control is delayed.

9. A brake control apparatus according to claim 5, wherein the turn controlling means operates to continue to increase brake fluid pressure of the wheel braking force producing device of said second wheel during a time period when the anti-skid controlling means is reducing the brake fluid pressure of the wheel braking force producing device to said first wheel.

10. A brake control apparatus according to claim 5, wherein the turn controlling means operates to increase the applied brake fluid pressure to the wheel braking force producing device of said second wheel when the predetermined condition for executing the anti-skid control is based on one of a brake fluid pressure holding and reducing modes of the wheel braking force producing device of said second wheel.

11. A brake control apparatus according to claim 5, wherein the turn controlling means controls the anti-skid control means to increase the brake fluid pressure of the wheel braking force producing device of said second wheel when the predetermined condition for executing the anti-skid control is based on one of a brake fluid pressure holding and reducing modes of the wheel braking force producing device of said second wheel.

* * * * *